United States Patent
Li et al.

(10) Patent No.: US 12,096,000 B2
(45) Date of Patent: Sep. 17, 2024

(54) METHOD AND APPARATUS FOR SCENE DETECTION BASED ENCODING

(71) Applicant: Tencent America LLC, Palo Alto, CA (US)

(72) Inventors: Guichun Li, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/962,265

(22) Filed: Oct. 7, 2022

(65) Prior Publication Data
US 2023/0179774 A1  Jun. 8, 2023

Related U.S. Application Data

(60) Provisional application No. 63/287,445, filed on Dec. 8, 2021.

(51) Int. Cl.
*H04N 19/142* (2014.01)
*H04N 19/105* (2014.01)
*H04N 19/172* (2014.01)
*H04N 19/179* (2014.01)
*H04N 19/80* (2014.01)

(52) U.S. Cl.
CPC ......... *H04N 19/142* (2014.11); *H04N 19/105* (2014.11); *H04N 19/172* (2014.11); *H04N 19/179* (2014.11); *H04N 19/80* (2014.11)

(58) Field of Classification Search
CPC .. H04N 19/105; H04N 19/142; H04N 19/172; H04N 19/179; H04N 19/80

(Continued)

(56) References Cited

U.S. PATENT DOCUMENTS

2014/0376616 A1* 12/2014 Li ................ H04N 19/154
                                            375/240.03
2014/0376624 A1   12/2014 Li et al.
(Continued)

FOREIGN PATENT DOCUMENTS

WO   2020185152 A1   9/2020
WO   2021063421 A1   4/2021

OTHER PUBLICATIONS

Nasiri et al.( F. Nasiri, W. Hamidouche, L. Morin, N. Dhollande and G. Cocherel, "Prediction-Aware Quality Enhancement of VVC Using CNN," 2020 IEEE International Conference on Visual Communications and Image Processing (VCIP), Macau, China, 2020, pp. 310-313, doi: 10.1109/VCIP49819.2020.9301884.)(Year: 2020).*

(Continued)

*Primary Examiner* — Christopher S Kelley
*Assistant Examiner* — Ana Picon-Feliciano
(74) *Attorney, Agent, or Firm* — ARENTFOX SCHIFF LLP

(57) ABSTRACT

In a method, whether a sequence of pictures includes a flash picture is determined. The flash picture is associated with a scene change between (i) a first scene of a picture of the sequence of pictures and (ii) a second scene of a prior picture and a subsequent picture of the picture in the sequence of pictures. The scene change is determined based on a content change between the first scene and the second scene being larger than a threshold. An encoding process is performed on a current picture in the sequence of pictures in response to (i) the picture being determined as the flash picture and (ii) the picture being the current picture.

20 Claims, 17 Drawing Sheets

(58) Field of Classification Search
USPC .................................................. 375/240.02
See application file for complete search history.

(56) References Cited

U.S. PATENT DOCUMENTS

| | | | |
|---|---|---|---|
| 2017/0180746 A1* | 6/2017 | Li | H04N 19/179 |
| 2021/0092461 A1* | 3/2021 | Gadgil | H04N 19/132 |
| 2021/0329286 A1* | 10/2021 | Wang | H04N 19/82 |
| 2022/0060692 A1* | 2/2022 | Zhang | H04N 19/176 |
| 2022/0174277 A1* | 6/2022 | Wennersten | H04N 19/105 |
| 2022/0256195 A1* | 8/2022 | Zhang | H04N 19/46 |

OTHER PUBLICATIONS

ITU-T Study Group, "Series H: Audiovisual and multimedia systems: Infrastructure of audiovisual services-coding of moving video," in General Secretariat and Telecom Radiocommunication (ITU-R) Standardization (ITU-T), sec. H 265 Dec. 2016, pp. 1-664.

B.Bross et al., "Versatile Video Coding Editorial Refinements on Draft 10", Joint Video Experts Team (JVET) of ITU-T SG 16 WP 3 and ISO/IEC JTC 1/SC 29, 20th Meeting, by teleconference, Oct. 7-16, 2020, Document: JVET-T2001-v2, pp. 1-511.

J. Chen et al., "Algorithm description for Versatile Video Coding and Test Model 10 (VTM 10)", Joint Video Experts Team (JVET) of ITU-T SG 16 WP 3 and ISO/IEC JTC 1/SC 29/WG 11, 19th Meeting: by teleconference, Jun. 22-Jul. 1, 2020, Document: JVET-S2002-v1, pp. 1-97.

International Search Report and Written Opinion issued Jan. 20, 2023 in Application No. PCT/US2022/077903, 10 pages.

Nasiri et al., Prediction-Aware Quality Enhancement of VVC Using CNN, 2020 IEEE International Conference on Visual Communications and Image Processing (VCIP), Dec. 2020, pp. 310-313.

* cited by examiner

METHOD AND APPARATUS FOR SCENE DETECTION BASED ENCODING

INCORPORATION BY REFERENCE

The present application claims the benefit of priority to U.S. Provisional Application No. 63/287,445, "Method and Apparatus for Scene Detection Based Encoding" filed on Dec. 8, 2021, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video and/or decoding includes processing circuitry.

According to an aspect of the disclosure, a method of video encoding performed in a video encoder is provided. In the method, whether a sequence of pictures includes a flash picture can be determined. The flash picture can be associated with a scene change between (i) a first scene of a picture of the sequence of pictures and (ii) a second scene of a prior picture and a subsequent picture of the picture in the sequence of pictures. The scene change can be determined based on a content change between the first scene and the second scene being larger than a threshold. An encoding process can be performed on a current picture in the sequence of pictures in response to (i) the picture being determined as the flash picture and (ii) the picture being the current picture.

In an example, the picture can be determined as the flash picture based on a contrast difference between the first scene and the second scene being larger than the threshold. In an example, the picture can be determined as the flash picture based on a feature difference between the first scene and the second scene being larger than the threshold.

When the encoding process includes the temporal filter process, the temporal filter process may not be performed on the picture based on the picture being determined as the flash picture and being the current picture.

When the encoding process includes a temporal filter process, the picture can be excluded as a reference picture in the temporal filter process based on the picture being determined as the flash picture and not being the current picture.

In response to the picture being excluded as the reference picture in the temporal filter process, another picture can be added to the sequence of pictures as a reference picture for the temporal filter process. Thus, a total number of reference pictures for the temporal filter process can remain constant. The other picture and the picture can be positioned at a same temporal side of the current picture in the temporal filter process.

The encoding process can include one of an attribute adjustment, a cost estimation, or a luma mapping with chroma scaling (LMCS) process. The LMCS process can include in-loop mapping of a luma component of the current picture and a scaling of a luma-dependent chroma residual of the current picture.

When the encoding process includes the attribute adjustment, the picture can be moved to a higher temporal level in the sequence of pictures based on the picture being the flash picture.

When the encoding process includes the attribute adjustment, a slice type of the picture can be set as a P slice based on the picture being the flash picture.

When the encoding process includes the attribute adjustment, the picture can be determined as a non-reference picture of the current picture based on the picture being the flash picture and not being the current picture.

When the encoding process includes the cost estimation, the cost estimation can be performed to generate a difference between the current picture and a prediction that is based on a weighted combination of the picture and another reference picture of the current picture based on the picture being determined as the flash picture and not being the current picture.

In some embodiments, at least one of bi-direction optical flow (BDOF) or decoder side motion vector refinement (DMVR) can be disabled for the current picture in the encoding process in response to (i) the picture being determined as the flash picture and being a reference picture of the current picture, and (ii) the current picture being a B type picture with two reference picture lists.

When the encoding process includes the LMCS process, the LMCS process can be disabled for the picture based on the picture being determined as the flash picture.

When the encoding process includes the LMCS process, based on the picture being determined as the flash picture, a set of LMCS parameters can be determined for the picture based on an LMCS picture analysis. The LMCS can be performed on the picture based on the determined set of LMCS parameters.

When the encoding process includes the LMCS process, the LMCS can be performed on the picture based on a predefined set of LMCS parameters in response to the picture being determined as the flash picture. The predefined set of LMCS parameters can be generated by training a plurality of general flash pictures.

According to another aspect of the disclosure, an apparatus is provided. The apparatus includes processing circuitry. The processing circuitry can be configured to perform any of the methods for video encoding/decoding.

Aspects of the disclosure also provide a non-transitory computer-readable storage medium storing instructions which when executed by a computer for video encoding and/or decoding cause the computer to perform any of the methods for video encoding/decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1A:
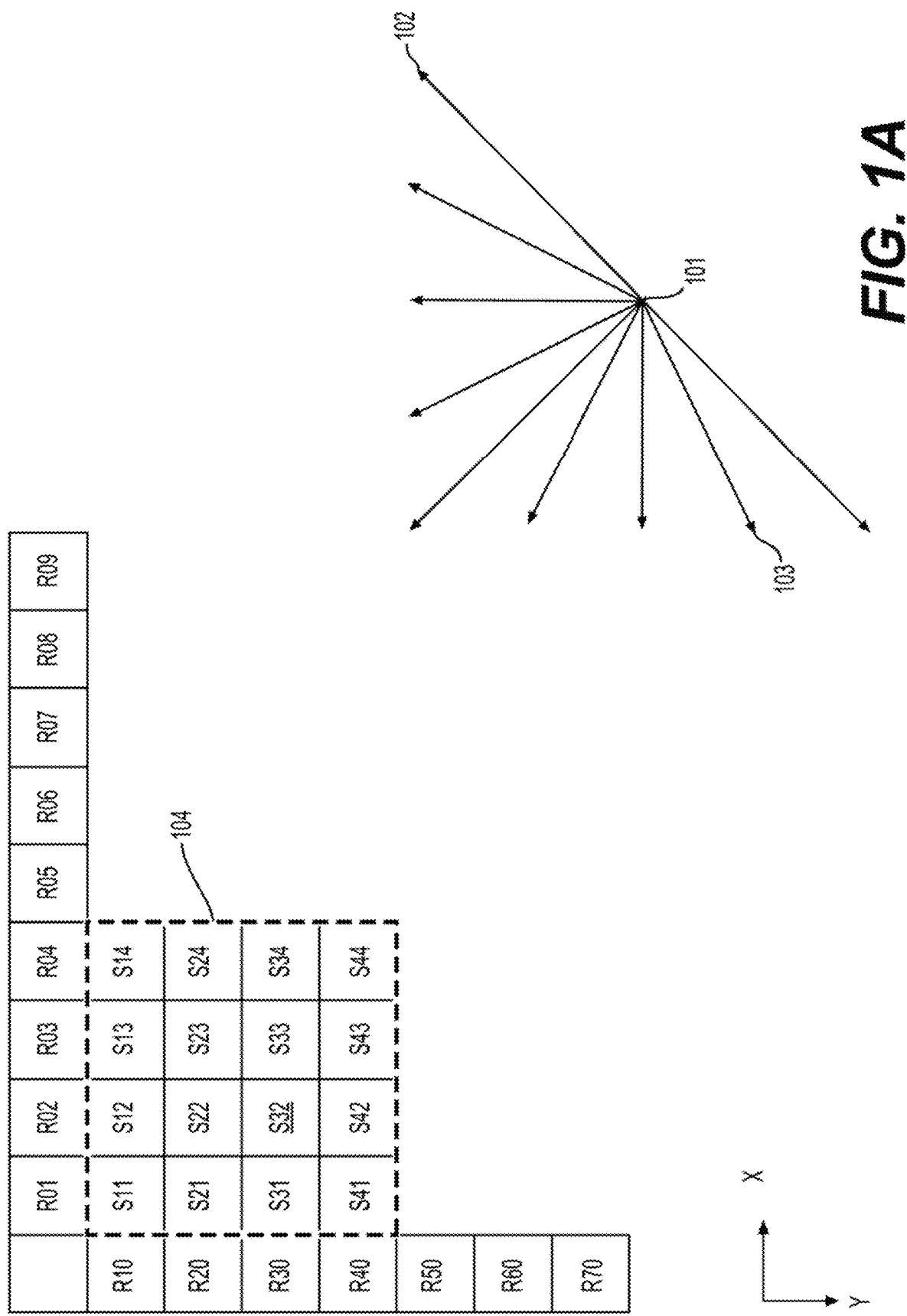
FIG. 1A is a schematic illustration of an exemplary subset of intra prediction modes.
Figure 1B:
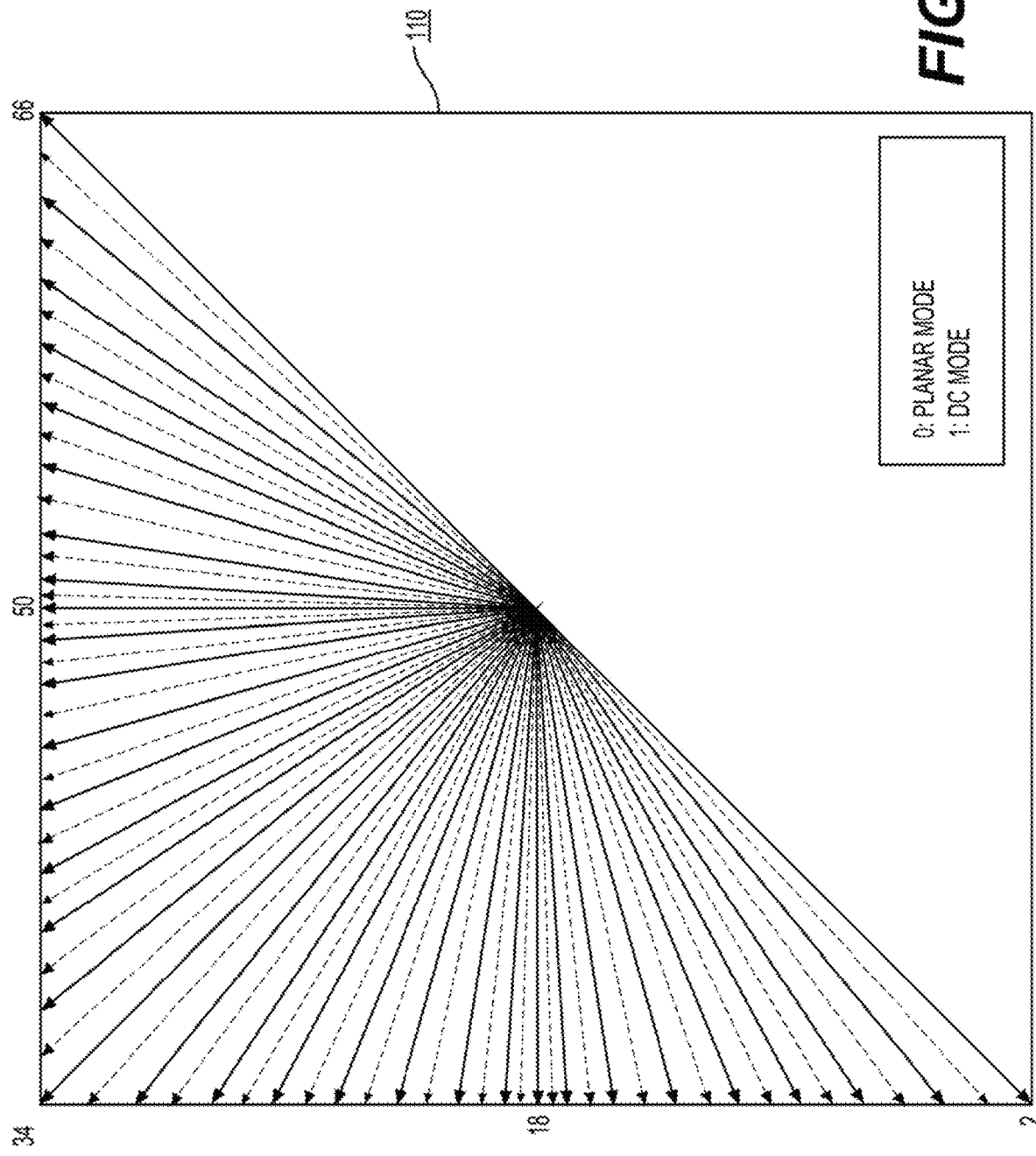
FIG. 1B is an illustration of exemplary intra prediction directions.
Figure 2:
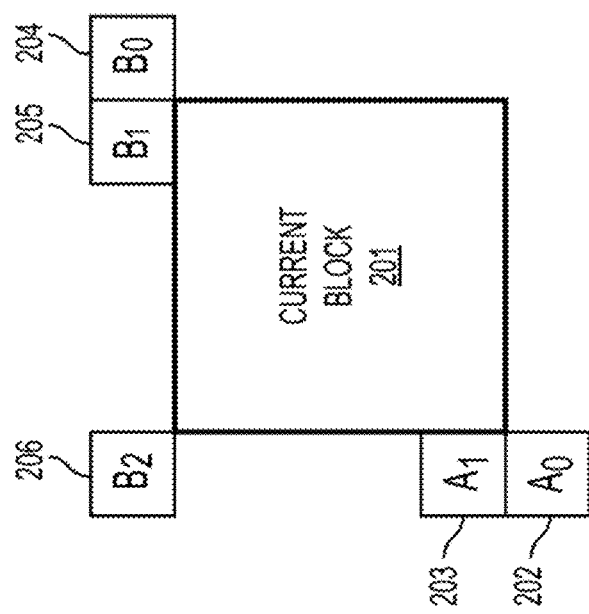
FIG. 2 is a schematic illustration of a current block and its surrounding spatial merge candidates in one example.
Figure 3:
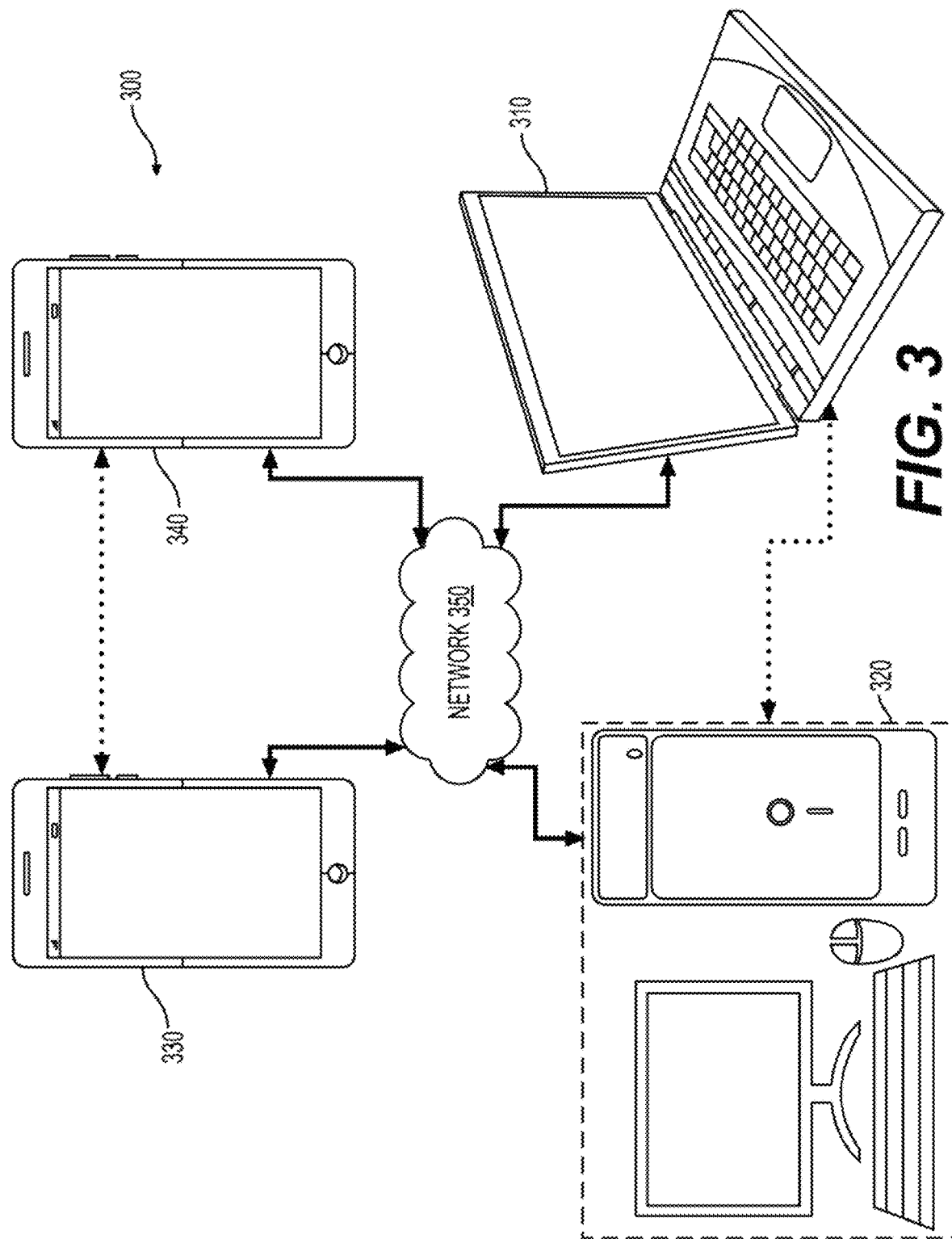
FIG. 3 is a schematic illustration of a simplified block diagram of a communication system (300) in accordance with an embodiment.

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
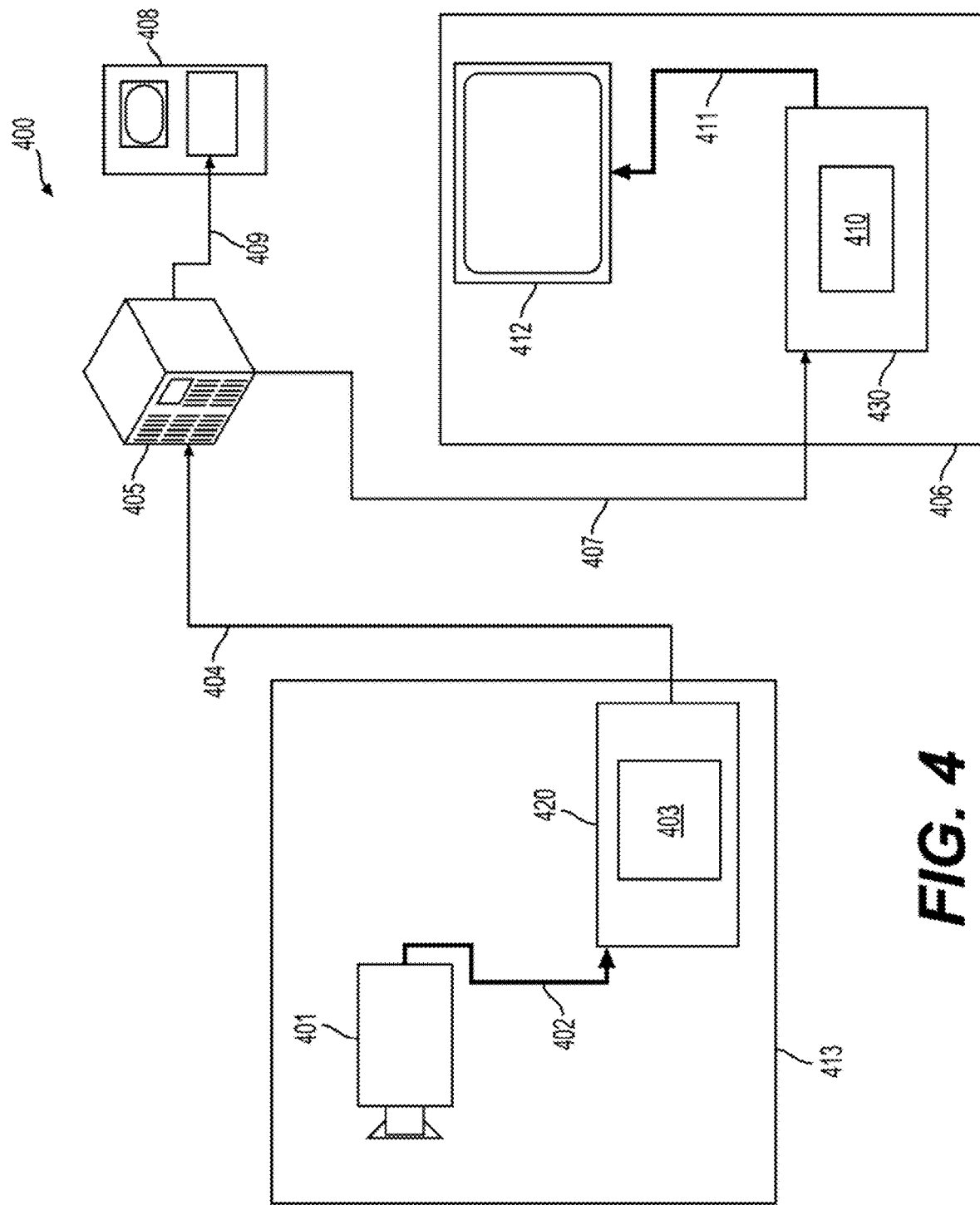
FIG. 4 is a schematic illustration of a simplified block diagram of a communication system (400) in accordance with an embodiment.

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
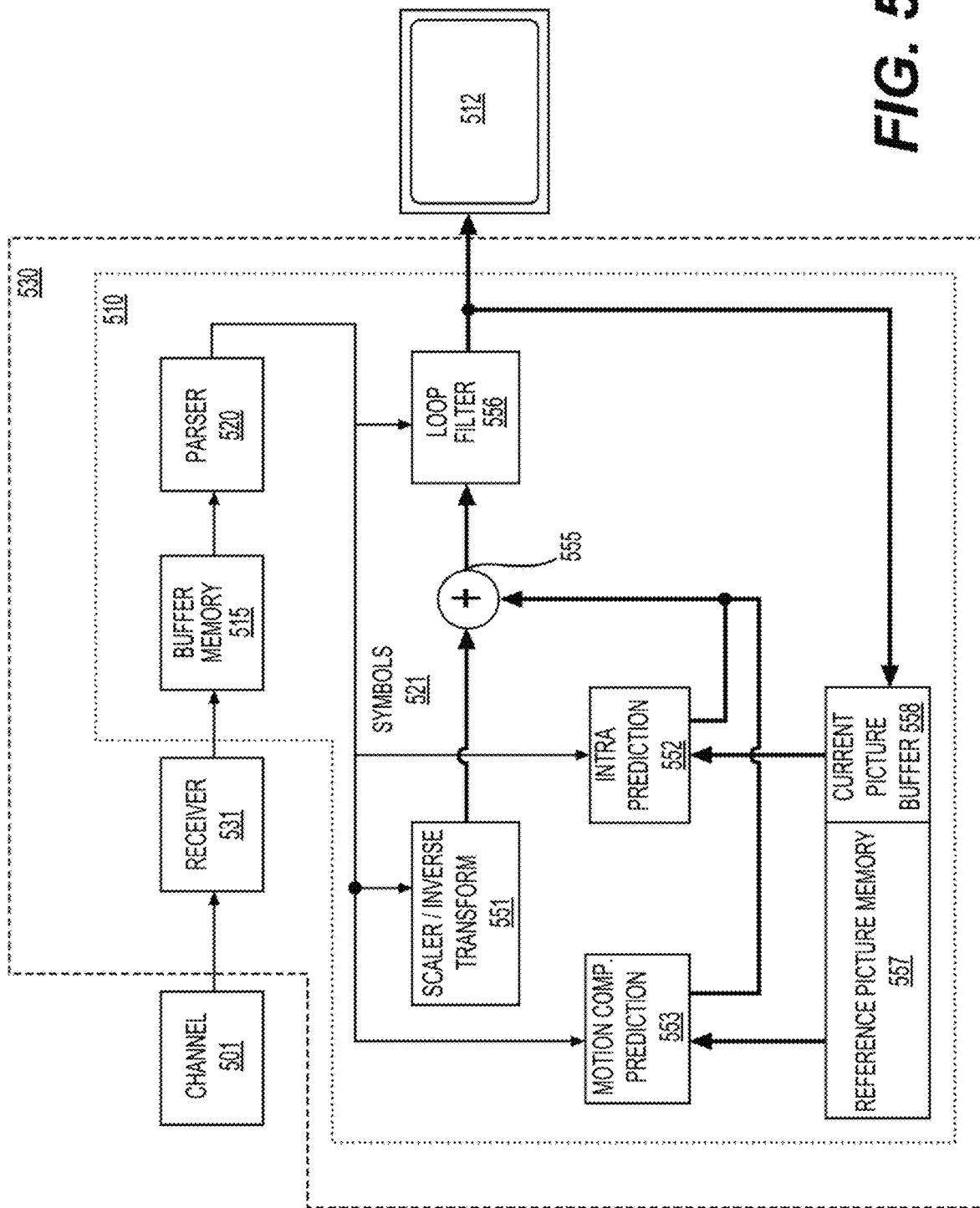
FIG. 5 is a schematic illustration of a simplified block diagram of a decoder in accordance with an embodiment.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
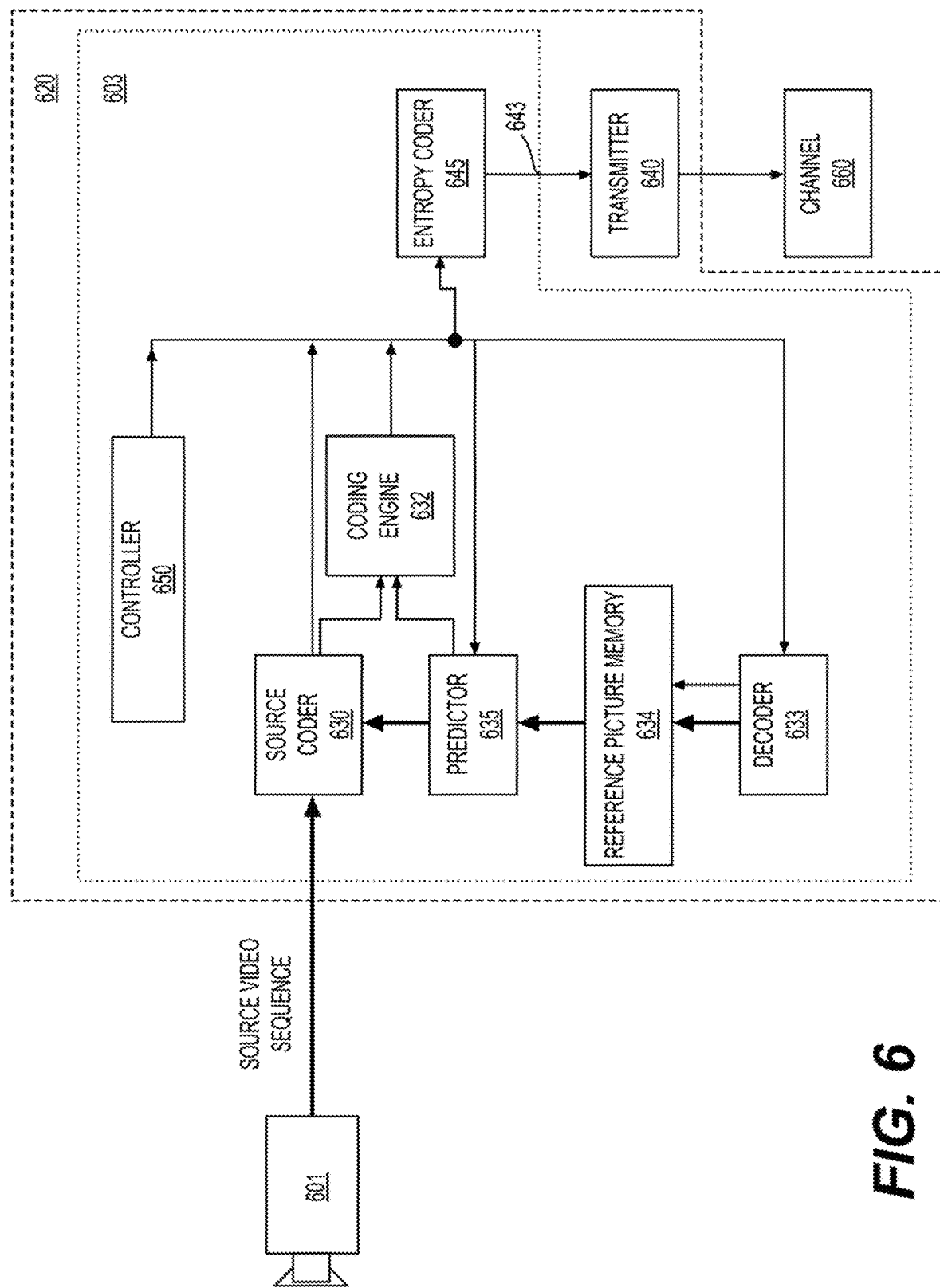
FIG. 6 is a schematic illustration of a simplified block diagram of an encoder in accordance with an embodiment.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
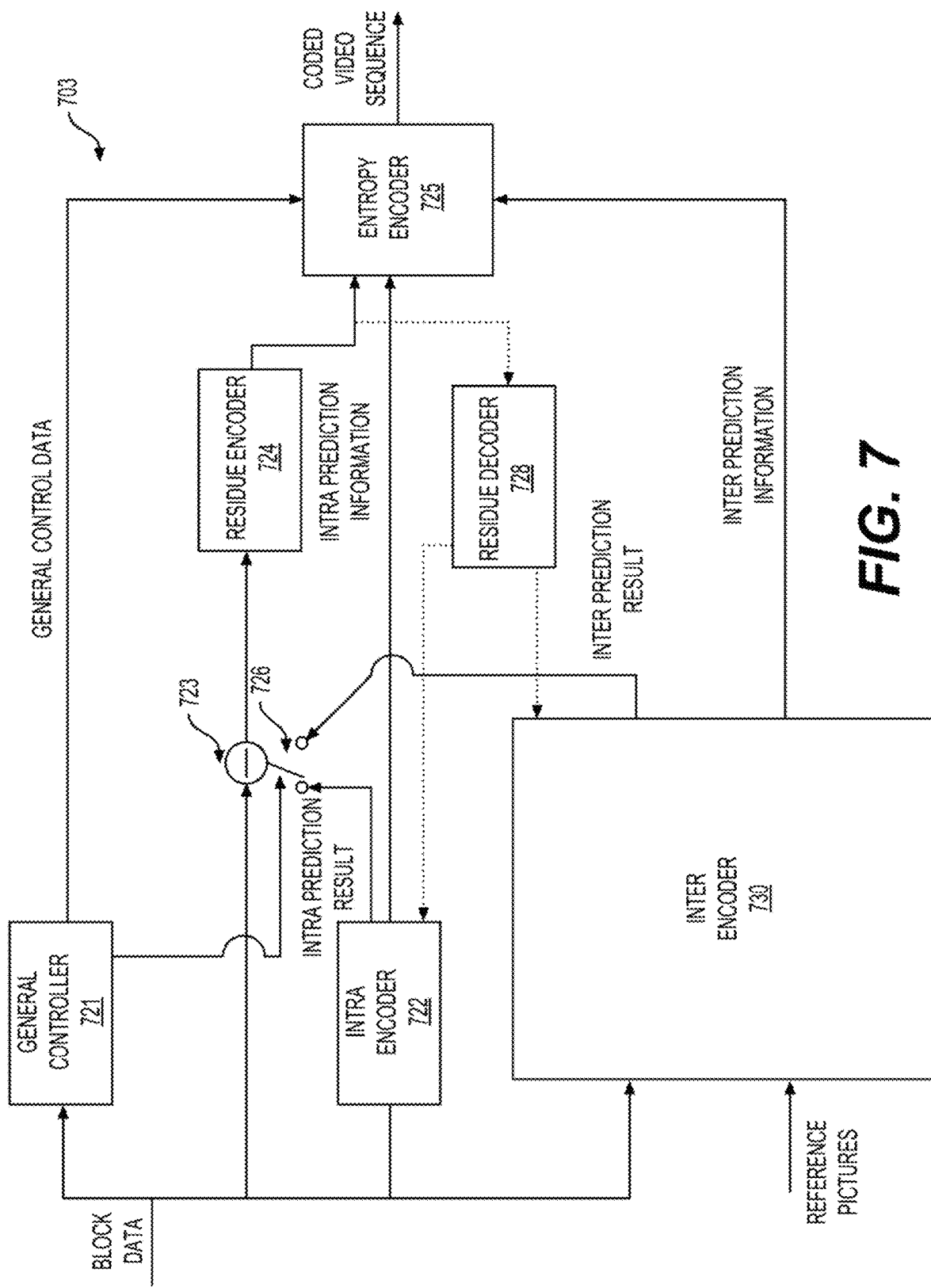
FIG. 7 shows a block diagram of an encoder in accordance with another embodiment.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
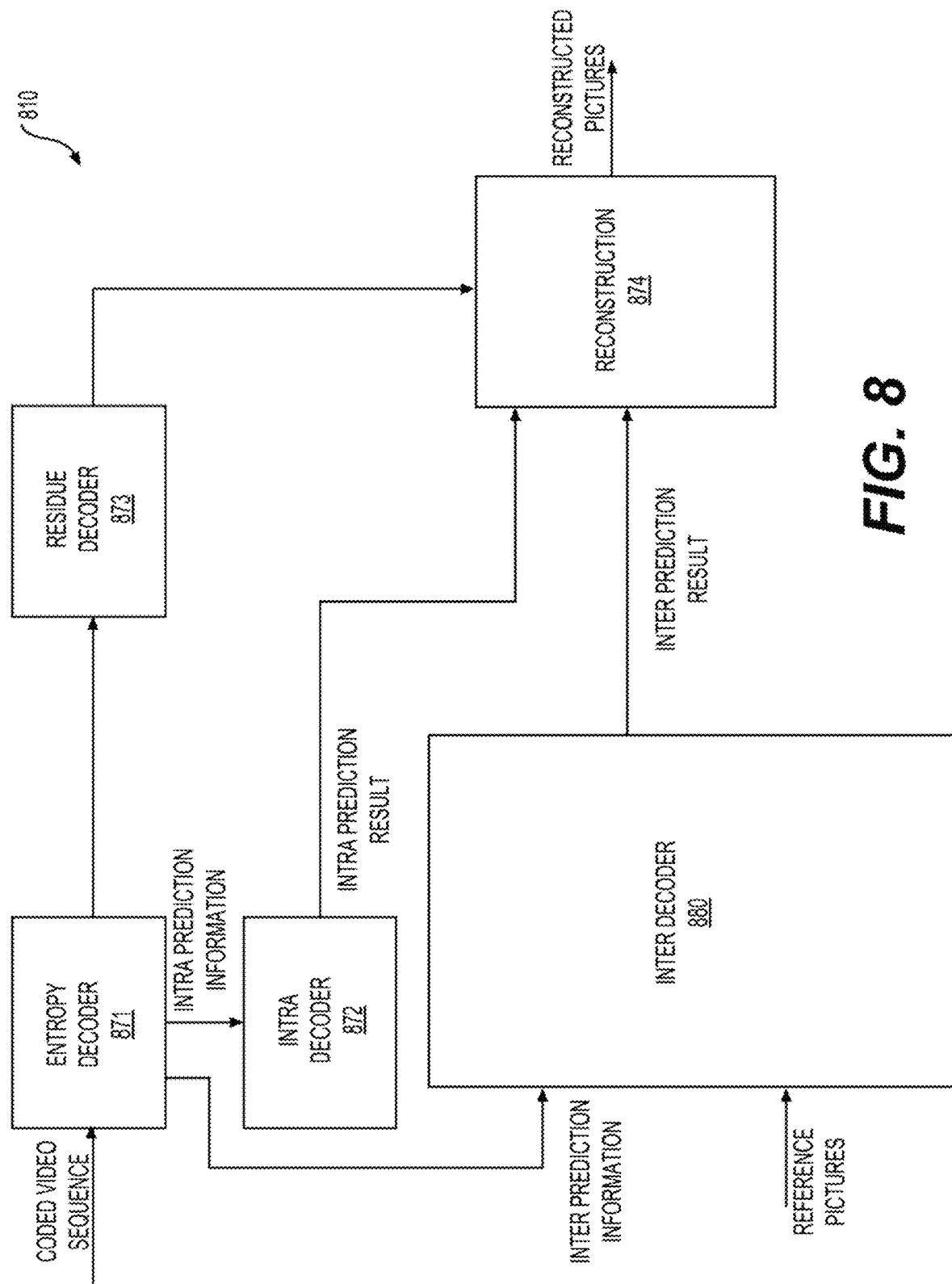
FIG. 8 shows a block diagram of a decoder in accordance with another embodiment.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

The disclosure includes embodiments related to scene detection based encoding. For example, the scene detection based encoding can include encoding methods related to pictures that are independent of other pictures. For example, the encoding methods may be related to pictures that are detected as camera flash pictures and/or inserted pictures.

ITU-T VCEG (Q6/16) and ISO/IEC MPEG (JTC 1/SC 29/WG 11) published the H.265/HEVC (High Efficiency Video Coding) standard in 2013 (version 1), 2014 (version 2), 2015 (version 3), and 2016 (version 4). In 2015, the two standard organizations jointly formed JVET (Joint Video Exploration Team) to explore the potential of developing a next video coding standard beyond HEVC. In October 2017, the two standard organizations issued the Joint Call for Proposals on Video Compression with Capability beyond HEVC (CfP). By Feb. 15, 2018, 22 CfP responses on standard dynamic range (SDR), 12 CfP responses on high dynamic range (HDR), and 12 CfP responses on 360 video categories were submitted, respectively. In April 2018, all received CP responses were evaluated in the 122 MPEG/10th JVET meeting. As a result of the meeting, JVET formally launched a standardization process of next-generation video coding beyond HEVC. The new standard was named Versatile Video Coding (VVC), and JVET was renamed as Joint Video Experts Team. In 2020, ITU-T VCEG (Q6/16) and ISO/IEC MPEG (JTC 1/SC 29/WG 11) published the VVC video coding standard (version 1).

In inter prediction, for each inter-predicted coding unit (CU), motion parameters are required for coding features of VVC, for example, to be used for the inter-predicted sample generation. The motion parameters can include motion vectors, reference picture indices, a reference picture list usage index, and/or additional information. The motion parameters can be signaled in an explicit or implicit manner. When a CU is coded with a skip mode, the CU can be associated with one PU, and a significant residual coefficient, a coded motion vector delta, and/or a reference picture index may not be required. When a CU is coded with a merge mode, the motion parameters for the CU can be obtained from neighboring CUs. The neighboring CUs can include spatial and temporal candidates, and additional schedules (or additional candidates) such as introduced in VVC. The merge mode can be applied to any inter-predicted CU, not only to skip mode. An alternative to the merge mode is an explicit transmission of motion parameters, where a motion vector, a corresponding reference picture index for each reference picture list, a reference picture list usage flag, and/or other needed information can be signaled explicitly per CU.

In VVC, a VVC Test model (VTM) reference software can include a number of new and refined inter prediction coding tools, which can include one or more of the following:

(1) Extended merge prediction
 (2) Merge motion vector difference (MMVD)
 (3) Advanced Motion Vector Prediction (AMVP) mode with symmetric MVD signalling
 (4) Affine motion compensated prediction
 (5) Subblock-based temporal motion vector prediction (SbTMVP)
 (6) Adaptive motion vector resolution (AMVR)
 (7) Motion field storage: $1/16^{th}$ luma sample MV storage and 8×8 motion field compression
 (8) Bi-prediction with CU-level weights (BCW)
 (9) Bi-directional optical flow (BDOF)
 (10) Decoder-side motion vector refinement (DMVR)
 (11) Combined inter and intra prediction (CIIP)
 (12) Geometric partitioning mode (GPM)

In Bi-prediction with CU-level weights (BCW), a bi-prediction signal, such as in HEVC, can be generated by averaging two prediction signals obtained from two different reference pictures and/or using two different motion vectors. In VVC, the bi-prediction mode can be extended beyond simple averaging to allow weighted averaging of the two prediction signals. In an example, the weighted averaging of the two prediction signals can be shown in equation (1)

$$P_{bi\text{-}pred} = ((8-w)*P_0 + w*P_1 + 4) >> 3 \qquad \text{Eq. (1)}$$

where w can be a weight, $P_0$ can be a first predictor, and $P_1$ can be a second predictor, respectively. Five weights can be allowed in the weighted averaging bi-prediction, for example $w \in \{-2, 3, 4, 5, 10\}$. For each bi-predicted CU, the weight w can be determined in one of two ways: (1) for a non-merge CU, a weight index can be signalled after the motion vector difference, or (2) for a merge CU, the weight index can be inferred from neighboring blocks based on a merge candidate index. BCW may only be applied to CUs with 256 or more luma samples (e.g., CU width times CU height is greater than or equal to 256). For low-delay pictures, all 5 weights can be used. For non-low-delay pictures, only 3 weights (e.g., $w \in \{3,4,5\}$) can be used.

At an encoder, fast search algorithms can be applied to find the weight index without significantly increasing the encoder complexity. The fast search algorithms can be summarized as follows.

(1) when combined with AMVR, unequal weights may only be conditionally checked for 1-pel and 4-pel motion vector precisions if the current picture is a low-delay picture.

(2) when combined with affine, affine ME will be performed for unequal weights if and only if the affine mode is selected as the current best mode.

(3) when two reference pictures in bi-prediction are the same, unequal weights may only be conditionally checked.

(4) unequal weights may not be searched when certain conditions are met, depending on the POC distance between the current picture and reference pictures of the current picture, a coding quantization parameter (QP), and a temporal level.

The BCW weight index can be coded using one context coded bin followed by bypass coded bins. A first context coded bin can indicate if equal weight is used. If an unequal weight is used, additional bins can be signalled using bypass coding to indicate which unequal weight can be used.

Weighted prediction (WP), which can be processed in a picture level, can be a coding tool supported by video standards, such as the H.264/AVC and HEVC standards, to efficiently code video content with fading. Support for WP can also be added into the VVC standard. WP can allow weighting parameters (e.g., a weight and an offset) to be signalled for each reference picture in each of reference picture lists L0 and L1. Then, during motion compensation, the weight(s) and offset(s) of corresponding reference picture(s) can be applied. WP and BCW can be designed for different types of video content. In order to avoid interactions between WP and BCW, which can complicate VVC decoder design, if a CU uses WP, then the BCW weight index may not be signalled, and w can be inferred to be 4 (e.g., an equal weight is applied). For a merge CU, the weight index can be inferred from neighboring blocks based on a merge candidate index. The merge CU can be obtained based on one of a normal merge mode and an inherited affine merge mode. For a constructed affine merge mode, affine motion information can be constructed based on motion information of up to 3 blocks. The BCW index for a CU using the constructed affine merge mode can simply be set equal to the BCW index of a first control point MV.

CIIP and BCW, such as in VVC, may not be jointly applied for a CU. When a CU is coded with CIIP mode, the BCW index of the current CU can be set to 2, e.g., an equal weight.

Bi-directional optical flow (BDOF) in VVC, was previously referred to as BIO in the JEM. Compared to the JEM version, the BDOF in VVC can be a simpler version that requires less computation, especially in terms of the number of multiplications and the size of the multiplier.

BDOF can be used to refine a bi-prediction signal of a CU at a 4×4 subblock level. In an example, BDOF can be applied to a CU if the CU satisfies conditions as follows:

(1) The CU is coded using "true" bi-prediction mode, i.e., one of the two reference pictures is prior to the current picture in display order and the other is after the current picture in display order, (2) The distances (e.g., POC difference) from two reference pictures to the current picture are the same, (3) Both reference pictures are short-term reference pictures, (4) The CU is not coded using affine mode or the SbTMVP merge mode, (5) CU has more than 64 luma samples, (6) Both CU height and CU width are larger than or equal to 8 luma samples, (7) BCW weight index indicates equal weight, (8) Weighted position (WP) is not enabled for the current CU, and (9) CIIP mode is not used for the current CU.

BDOF may be only applied to a luma component. As the name of BDOF indicates, the BDOF mode can be based on an optical flow concept, which assumes that a motion of an object is smooth. For each 4×4 subblock, a motion refinement ($v_x$, $v_y$) can be calculated by minimizing a difference between L0 and L1 prediction samples. The motion refinement can then be used to adjust the bi-predicted sample values in the 4×4 subblock. BDOF can include steps as follows:

First, horizontal and vertical gradients, $$\frac{\partial I^{(k)}}{\partial x}(i, j) \text{ and } \frac{\partial I^{(k)}}{\partial y}(i, j),$$

k=0,1, of the two prediction signals from the reference list L0 and the reference list L1 can be computed by directly calculating a difference between two neighboring samples. The horizontal and vertical gradients can be provided in equations (2) and (3) as follows:

$$\frac{\partial I^{(k)}}{\partial x}(i, j) = \left( \left( I^{(k)}(i+1, j) \gg shift1 \right) - \left( I^{(k)}(i-1, j) \gg shift1 \right) \right) \quad \text{Eq. (2)}$$

$$\frac{\partial I^{(k)}}{\partial y}(i, j) = \left( \left( I^{(k)}(i, j+1) \gg shift1 \right) - \left( I^{(k)}(i, j-1) \gg shift1 \right) \right) \quad \text{Eq. (3)}$$

where $I^{(k)}(i,j)$ can be a sample value at coordinate (i,j) of the prediction signal in list k, k=0,1, and shift1 can be calculated based on a luma bit depth, bitDepth, as shift1=max(6, bitDepth−6).

Then, an auto- and cross-correlation of the gradients, $S_1$, $S_2$, $S_3$, $S_5$ and $S_6$, can be calculated according to equations (4)-(8) as follows:

$$S_1 = \Sigma_{(i,j) \in \Omega} \text{Abs}(\psi_x(i,j)), \quad \text{Eq. (4)}$$

$$S_2 = \Sigma_{(i,j) \in \Omega} \psi_x(i,j) \cdot \text{Sign}(\psi_y(i,j)) \quad \text{Eq. (5)}$$

$$S_3 = \Sigma_{(i,j) \in \Omega} \theta(i,j) \cdot \text{Sign}(\psi_x(i,j)) \quad \text{Eq. (6)}$$

$$S_5 = \Sigma_{(i,j) \in \Omega} \text{Abs}(\psi_y(i,j)) \quad \text{Eq. (7)}$$

$$S_6 = \Sigma_{(i,j) \in \Omega} \theta(i,j) \cdot \text{Sign}(\psi_y(i,j)) \quad \text{Eq. (8)}$$

where $\psi_x(i,j)$, $\psi_y(i,j)$, and $\theta(i,j)$ can be provided in equations (9)-(11) respectively.

$$\psi_x(i, j) = \left( \frac{\partial I^{(1)}}{\partial x}(i, j) + \frac{\partial I^{(0)}}{\partial x}(i, j) \right) \gg n_a \quad \text{Eq. (9)}$$

$$\psi_y(i, j) = \left( \frac{\partial I^{(1)}}{\partial y}(i, j) + \frac{\partial I^{(0)}}{\partial y}(i, j) \right) \gg n_a \quad \text{Eq. (10)}$$

$$\theta(i, j) = \left( I^{(1)}(i, j) \gg n_b \right) - \left( I^{(0)}(i, j) \gg n_b \right) \quad \text{Eq. (11)}$$

where Ω can be a 6×6 window around the 4×4 subblock, and the values of $n_a$ and $n_b$ can be set equal to min (1, bitDepth−11) and min (4, bitDepth−8), respectively.

The motion refinement $(v_x, v_y)$ can then be derived using the cross- and auto-correlation terms using equations (12) and (13) as follows:

$$v_x = S_1 > 0 ? \text{clip3}(-th'_{BIO}, th'_{BIO}, -((S_3 \cdot 2^{n_b-n_a}) >> \lfloor \log_2 S_1 \rfloor)) : 0 \quad \text{Eq. (12)}$$

$$v_y = S_5 > 0 ? \text{clip3}(-th'_{BIO}, th'_{BIO}, -((S_6 \cdot 2^{n_b-n_a}) - ((v_x S_{2,m}) << n_{S_2} + v_x S_{2,s})/2) >> \lfloor \log_2 S_5 \rfloor)) : 0 \quad \text{Eq. (13)}$$

where $S_{2,m} = S_2 >> n_{S_2}$, $S_{2,s} = S_2 \& (2^{n_{S_2}} - 1)$, $th'_{BIO} = 2^{max(5,BD-7)}$, $\lfloor \cdot \rfloor$ is a floor function, and $n_{S_2} = 12$. Based on the motion refinement and the gradients, an adjustment can be calculated for each sample in the 4×4 subblock based on equation (14):

$$b(x,y) = rnd\left(\left(v_x\left(\frac{\partial I^{(1)}(x,y)}{\partial x} - \frac{\partial I^{(0)}(x,y)}{\partial x}\right) + v_y\left(\frac{\partial I^{(1)}(x,y)}{\partial y} - \frac{\partial I^{(0)}(x,y)}{\partial y}\right) + 1\right)/2\right) \quad \text{Eq. (14)}$$

Finally, the BDOF samples of the CU can be calculated by adjusting the bi-prediction samples in equation (15) as follows:

$$\text{pred}_{BDOF}(x,y) = (I^{(0)}(x,y) + I^{(1)}(x,y) + b(x,y) + o_{offset}) >> \text{shift} \quad \text{Eq. (15)}$$

Values can be selected such that multipliers in the BDOF process do not exceed 15-bits, and a maximum bit-width of the intermediate parameters in the BDOF process can be kept within 32-bits.

Figure 9:
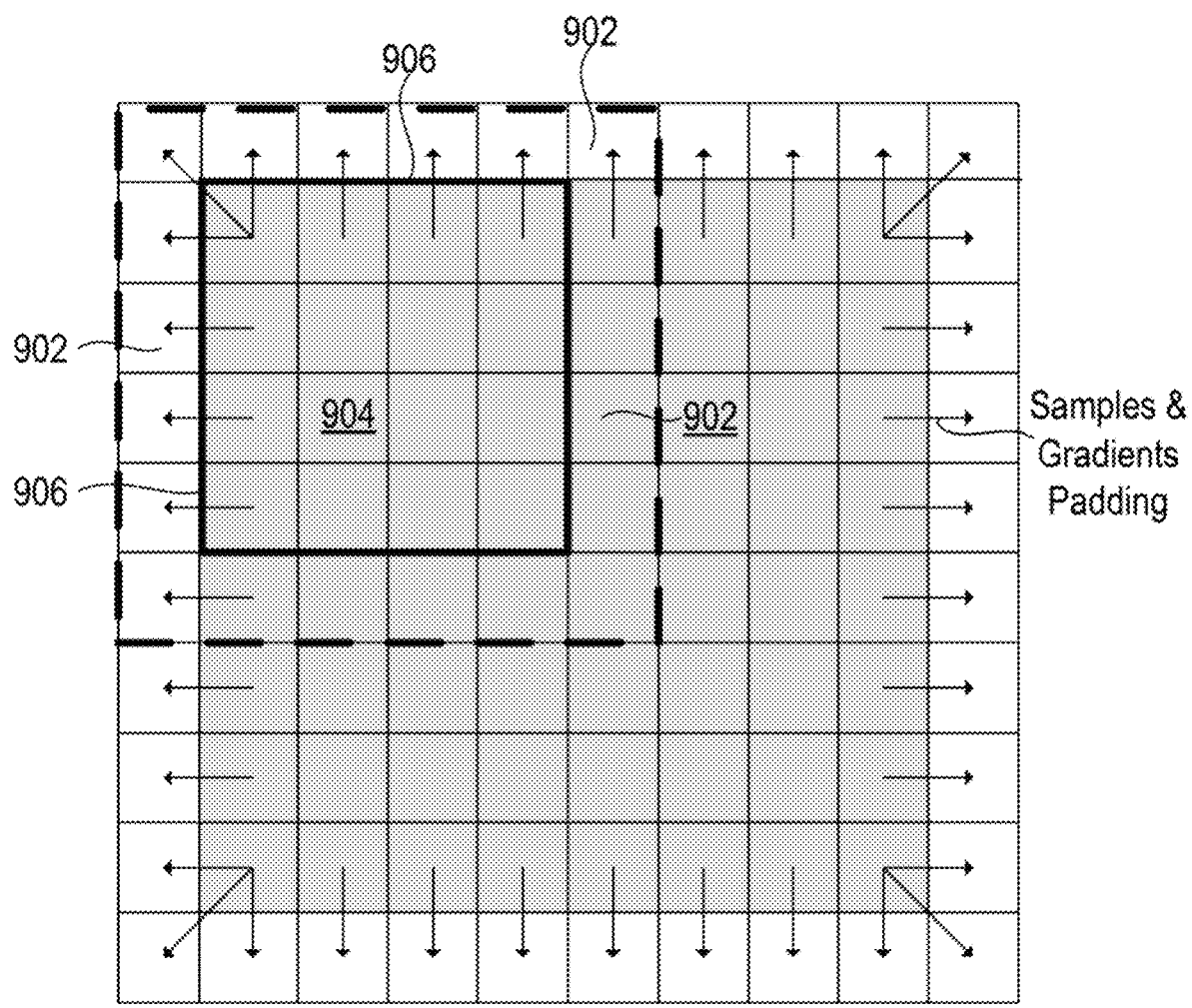
FIG. 9 shows a schematic illustration of an exemplary extended coding unit (CU) region for bi-directional optical flow (BDOF).

In order to derive the gradient values, some prediction samples $I^{(k)}(i,j)$ in the list k (k=0,1) outside of the current CU boundaries need to be generated. As shown in FIG. 9, BDOF in VVC can use one extended row/column (902) around boundaries (906) of a CU (904). In order to control the computational complexity of generating the out-of-boundary prediction samples, prediction samples in an extended area (e.g., unshaded region in FIG. 9) can be generated by taking the reference samples at the nearby integer positions (e.g., using a floor( ) operation on the coordinates) directly without interpolation, and a normal 8-tap motion compensation interpolation filter can be used to generate prediction samples within the CU (e.g., the shaded region in FIG. 9). The extended sample values can be used in gradient calculation only. For the remaining steps in the BDOF process, if any samples and gradient values outside of the CU boundaries are needed, the samples and gradient values can be padded (e.g., repeated) from nearest neighbors of the samples and gradient values.

When a width and/or a height of a CU is larger than 16 luma samples, the CU can be split into subblocks with a width and/or a height equal to 16 luma samples, and the subblock boundaries can be treated as CU boundaries in the BDOF process. A maximum unit size for a BDOF process can be limited to 16×16. For each subblock, the BDOF process can be skipped. When a sum of absolute difference (SAD) between the initial L0 and L1 prediction samples is smaller than a threshold, the BDOF process may not be applied to the subblock. The threshold can be set equal to (8*W*(H>>1)), where W can indicate the width of the subblock, and H can indicate the height of the subblock. To avoid the additional complexity of a SAD calculation, the SAD between the initial L0 and L1 prediction samples calculated in DMVR process can be re-used in the BBOF process.

If BCW is enabled for a current block, i.e., the BCW weight index indicates unequal weighting, then bi-directional optical flow can be disabled. Similarly, if WP is enabled for the current block, i.e., a luma weight flag (e.g., luma_weight_lx_flag) is 1 for either of the two reference pictures, then BDOF may also be also disabled. When a CU is coded with symmetric MVD mode or CIIP mode, BDOF may also be disabled.

In order to increase the accuracy of the MVs of the merge mode, a bilateral-matching (BM)-based decoder side motion vector refinement can be applied, such as in VVC. In a bi-prediction operation, a refined MV can be searched around initial MVs in a reference picture list L0 and a reference picture list L1. The BM method can calculate a distortion between two candidate blocks in the reference picture list L0 and list L1.

Figure 10:
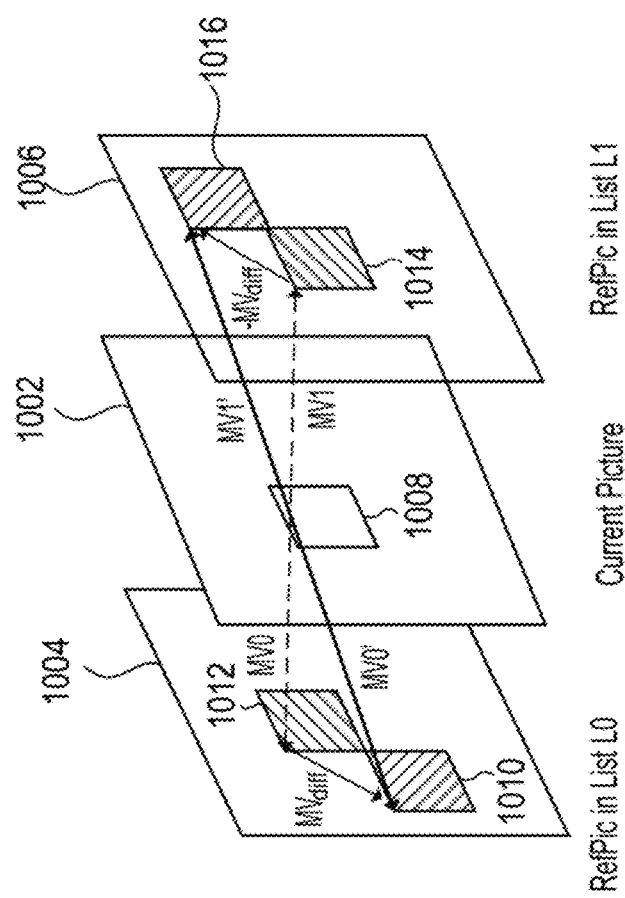
FIG. 10 shows a schematic illustration of an example of decoding side motion vector refinement.

FIG. 10 shows an exemplary schematic view of a BM-based decoder side motion vector refinement. As show in FIG. 10, a current picture (1002) can include a current block (1008). The current picture can include a reference picture list L0 (1004) and a reference picture list L1 (1006). The current block (1008) can include an initial reference block (1012) in the reference picture list L0 (1004) according to an initial motion vector MV0 and an initial reference block (1014) in the reference picture list L1 (1006) according to an initial motion vector MV1. A searching process can be performed around the initial MV0 in the reference picture list L0 (1004) and the initial MV1 in the reference picture list L1 (1006). For example, a first candidate reference block (1010) can be identified in the reference picture list L0 (1004) based on a candidate motion vector MV0' around the initial MV0, and a first candidate reference block (1016) can be identified in the reference picture list L1 (1006) based on a candidate motion vector MV1' around the initial MV1. A SAD between a pair of candidate reference blocks in the reference picture list L0 and the reference picture list L1 can be calculated. For example, a SAD can be calculated for the first candidate reference block (1010) in the first reference picture list L0 and the first candidate reference block (1016) in the reference picture list L1. MV candidates associated with the lowest SAD can become the refined MVs and used to generate a bi-predicted signal to predict the current block (1008).

In an example. the application of DMVR can be restricted and may only be applied for CUs which are coded based on modes and features, such as in VVC, as follows:
(1) CU level merge mode with bi-prediction MV,
(2) One reference picture is in the past and another reference picture is in the future with respect to the current picture,
(3) The distances (e.g., POC difference) from two reference pictures to the current picture are the same,
(4) Both reference pictures are short-term reference pictures,
(5) CU has more than 64 luma samples,
(6) Both CU height and CU width are larger than or equal to 8 luma samples,
(7) BCW weight index indicates equal weight,
(8) WP is not enabled for the current block, and
(9) CIIP mode is not used for the current block.

The refined MV derived by the DMVR process can be used to generate inter prediction samples and be used in temporal motion vector prediction for future pictures coding. While the original MV can be used in the deblocking process and be used in spatial motion vector prediction for future CU coding.

In DVMR, search points can surround the initial MV and the MV offset can obey a MV difference mirroring rule. In other words, any points that are checked by DMVR, denoted by a candidate MV pair (MV0, MV1), can obey the MV difference mirroring rule that is shown in equations (16) and (17):

$$MV0'=MV0+MV\_offset \quad \text{Eq. (16)}$$

$$MV1'=MV1-MV\_offset \quad \text{Eq. (17)}$$

Where MV_offset can represent a refinement offset between the initial MV and the refined MV in one of the reference pictures. The refinement search range can be two integer luma samples from the initial MV. The searching can include an integer sample offset search stage and a fractional sample refinement stage.

For example, a 25 points full search can be applied for integer sample offset searching. The SAD of the initial MV pair can first be calculated. If the SAD of the initial MV pair is smaller than a threshold, the integer sample stage of DMVR can be terminated. Otherwise SADs of the remaining 24 points can be calculated and checked in a scanning order, such as a raster scanning order. The point with the smallest SAD can be selected as an output of an integer sample offset searching stage. To reduce the penalty of the uncertainty of DMVR refinement, the original MV during the DMVR process can have a priority to be selected. The SAD of the reference blocks referred to by the initial MV candidates can be decreased by ¼ of the SAD value.

The integer sample search can be followed by a fractional sample refinement. To save calculational complexity, the fractional sample refinement can be derived by using a parametric error surface equation, instead of an additional search with a SAD comparison. The fractional sample refinement can be conditionally invoked based on the output of the integer sample search stage. When the integer sample search stage is terminated with a center having the smallest SAD in either the first iteration search or the second iteration search, the fractional sample refinement can further be applied.

In a parametric error surface-based sub-pixel offsets estimation, the center position cost and the costs at four neighboring positions from the center can be used to fit a 2-D parabolic error surface equation based on equation (18):

$$E(x,y)=A(x-x_{min})^2+B(y-y_{min})^2+C \quad \text{Eq. (18)}$$

where ($x_{min}$, $y_{min}$) can correspond to a fractional position with the least cost and C can correspond to a minimum cost value. By solving the equation (18) using the cost value of the five search points, the ($x_{min}$,$y_{min}$) can be computed in equations (19) and (20):

$$x_{min}=(E(-1,0)-E(1,0))/(2(E(-1,0)+E(1,0)-2E(0,0))) \quad \text{Eq. (19)}$$

$$y_{min}=(E(0,-1)-E(0,1))/(2((E(0,-1)+E(0,1)-2E(0,0))) \quad \text{Eq. (20)}$$

The value of $x_{min}$ and $y_{min}$ can be automatically constrained to be between −8 and 8 since all cost values are positive and the smallest value is E(0,0). The constraints of the value of $x_{min}$ and $y_{min}$ can correspond to a half pel (or pixel) offset with 1/16th-pel MV accuracy in VVC. The computed fractional ($x_{min}$, $y_{min}$) can be added to the integer distance refinement MV to get the sub-pixel accurate refinement delta MV.

Bilinear-interpolation and sample padding can be applied, such as in VVC. A resolution of MVs can be 1/16 luma samples, for example. Samples at a fractional position can be interpolated using an 8-tap interpolation filter. In DMVR, search points can surround an initial fractional-pel MV with an integer sample offset, therefore the samples of the fractional position need to be interpolated for a DMVR search process. To reduce calculational complexity, a bi-linear interpolation filter can be used to generate the fractional samples for the searching process in DMVR. In another important effect, by using the bi-linear filter with a 2-sample search range, the DVMR does not access more reference samples compared to a normal motion compensation process. After the refined MV is attained with a DMVR search process, the normal 8-tap interpolation filter can be applied to generate a final prediction. In order not to access more reference samples compared to a normal MC process, the samples, which may not be needed for the interpolation process based on the original MV but may be needed for the interpolation process based on the refined MV, can be padded from samples that are available.

When a width and/or a height of a CU is larger than 16 luma samples, the CU can be further split into subblocks with a width and/or a height equal to 16 luma samples. A maximum unit size for DMVR searching process can be limited to 16×16.

Motion Compensated Temporal Filtering (MCTF) may be used as a preprocessing tool in various encoders. For example, VTM (VVC reference software) can use a temporal filter (TF) to increase similarity between a current frame and neighbor frames of the current fame so that residual information can be reduced. The term TF frame can be used to denote a frame to be filtered by the temporal filter. TF can be applied for each picture at an interval POC of 16 or 8. Up to 4 references in a forward and a backward direction can be used to derive a weight for bilateral filtering. Original samples of TF frames at a kth spatial location can be filtered as described in equation (21)

$$I_n(k) = \frac{I_o(k) + \Sigma_{i=0}^{7} w_r(i, a, k) I_r(i, k)}{1 + \Sigma_{i=0}^{7} w_r(i, a, k)} \quad \text{Eq. (21)}$$

where, $I_n(k)$ and $I_o(k)$ can represent a filtered pixel (or filtered pixel value) and an original pixel (or original pixel value) of a pixel i in a current picture at a spatial location k, respectively. k can be the location of the pixel i in the current picture. $I_r(i,k)$ can denote a collocated pixel (or collocated pixel value) in a neighboring picture $I_r$ for the pixel i in the current picture. The collocated pixel can also be located at a kth spatial location of the neighboring picture $I_r$ which is at a rth motion compensated reference frame. The neighboring picture $I_r$ can be derived by performing motion estimation and then motion compensation from the reference frame r to the current TF picture. A weight for each reference (or pixel) i in a number of available reference pictures at the spatial location k, $w_r(i,a,k)$, can be derived as follows in equation (22) for a luma sample:

$$w_r(i, a, k) = bw \cdot s_o \cdot s_r(i, a) \cdot e^{-\frac{\Delta I(i,k)^2}{sw \cdot \sigma_i(QP)^2}} \quad \text{Eq. (22)}$$

where, bw=0.4 stands for a base weight, $s_0$ is a basic filter strength decided by an interval POC as described in equation (23)

$$s_0 = \begin{cases} 1.50 & \text{if } POC \%16 = 0 \\ 0.95 & \text{if } POC \%8 = 0 \end{cases} \qquad \text{Eq. (23)}$$

A reference filter strength, $s_r(i,a)$, can be defined by a look up table depending on whether references are available in both directions (a=8 references) or one direction (a=4 references). $s_r(i,a)$ can be described in equation (24) as follows:

$$s_r(i, 4) = \begin{cases} 1.13 \\ 0.97 \\ 0.81 \\ 0.57 \end{cases}, \text{ and } s_r(i, 8) = \begin{cases} 0.33 \\ 0.41 \\ 0.57 \\ 0.85 \\ 0.85 \\ 0.57 \\ 0.41 \\ 0.33 \end{cases} \qquad \text{Eq. (24)}$$

ΔI(i,k) can represent a pixel difference between the original pixel at the spatial location k and the collocated pixels of the original pixel if the original pixel is at a ith reference picture. sw can denote a sigma base weight of 2. $\sigma_t(QP)=3*(QP-10)$ when QP is a slice QP. The base weight bw and the sigma weight sw can further be adjusted adaptively for each 8×8 block based on a block error and a simple block frequency weighting.

Scene cut detection may include a technique for detecting whether an abrupt scene transition occurs, for example when content changes from one scene to another scene. A scene change can result in a significant change in content, and can detected for example by evaluating a difference between temporally neighboring pictures.

Flash detection may include a technique for detecting whether one or more pictures are significantly different from other pictures in a sequence of pictures of one scene, such as due to a camera flash, or insertion of picture(s) during video editing. The flash detection can be performed in a similar way as scene cut detection, for example. Flash detection may be performed to determine whether past and future neighboring frames belong to a same scene.

Figure 11:
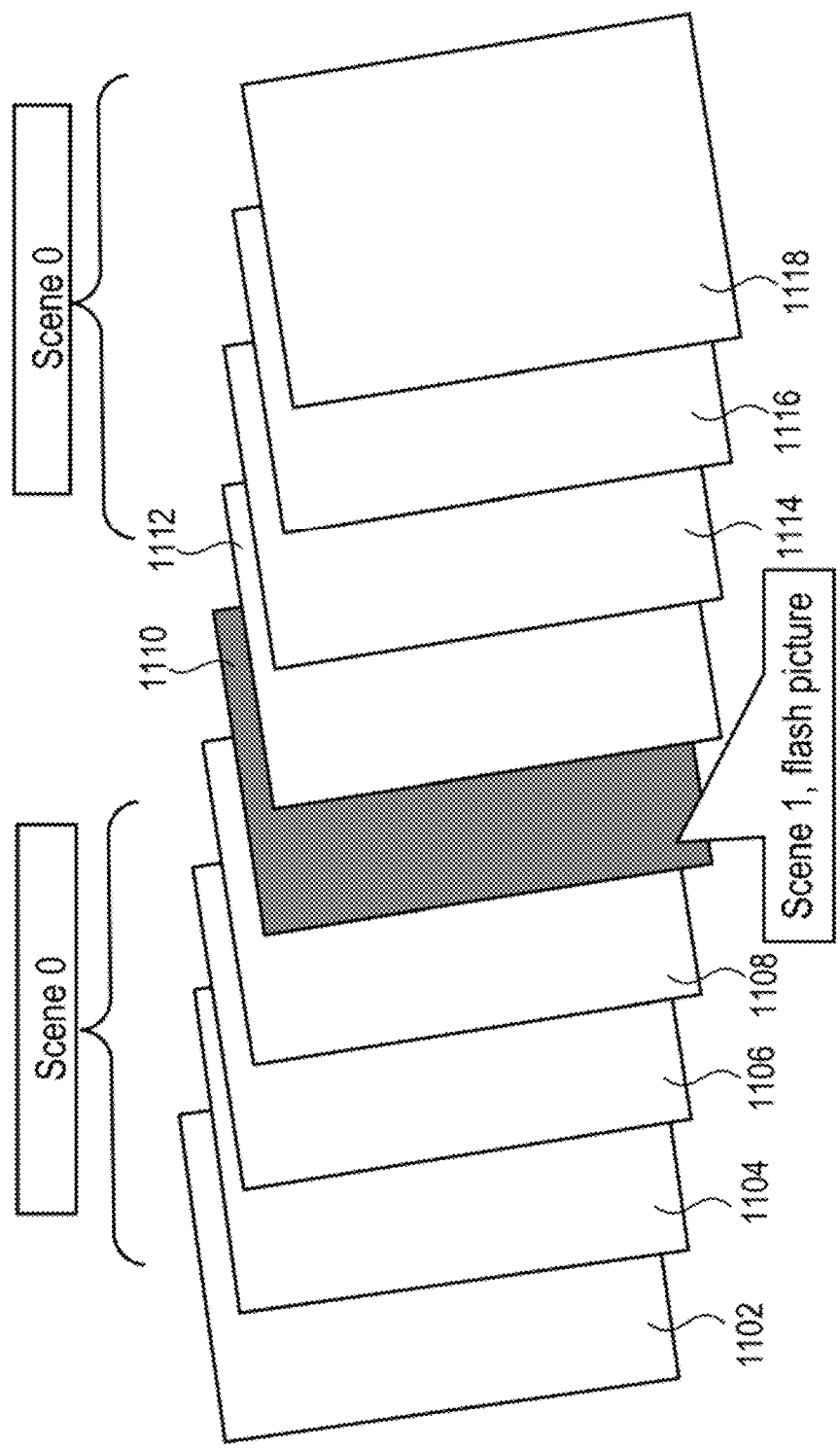
FIG. 11 shows a schematic illustration of an example of flash picture detection.

FIG. 11 shows a schematic illustration of an example of flash picture detection. As shown in FIG. 11, a sequence of pictures including pictures (1102), (1104), (1106), (1108), (1110), (1112), (1114), (11116), and (1118) can be provided. The picture (1110) in the sequence of pictures can be detected as a flash picture when the picture (1110) belongs to a first scene (e.g., scene 1), and the pictures (1102), (1104), (1106), and (1108) that are prior to the picture (1110) and the pictures (1112), (1114), (1116), and (1118) that are subsequent to the picture (1110) belong to a second scene (e.g., scene 0).

Fade detection can include a technique to detect whether a group of consecutive pictures are in the middle of a gradual transition from one scene to another. Some special cases may include transitioning into or out of a blank picture with one color, such as black or white. A histogram of pictures can be utilized to perform the fade detection.

Noise estimation can include a common technique in image processing, where a noise level can often be estimated via evaluating a gradient energy of a picture. Local contents like edges, smooth areas, or textures can be further utilized to derive the noise level with a higher accuracy.

Figure 12:
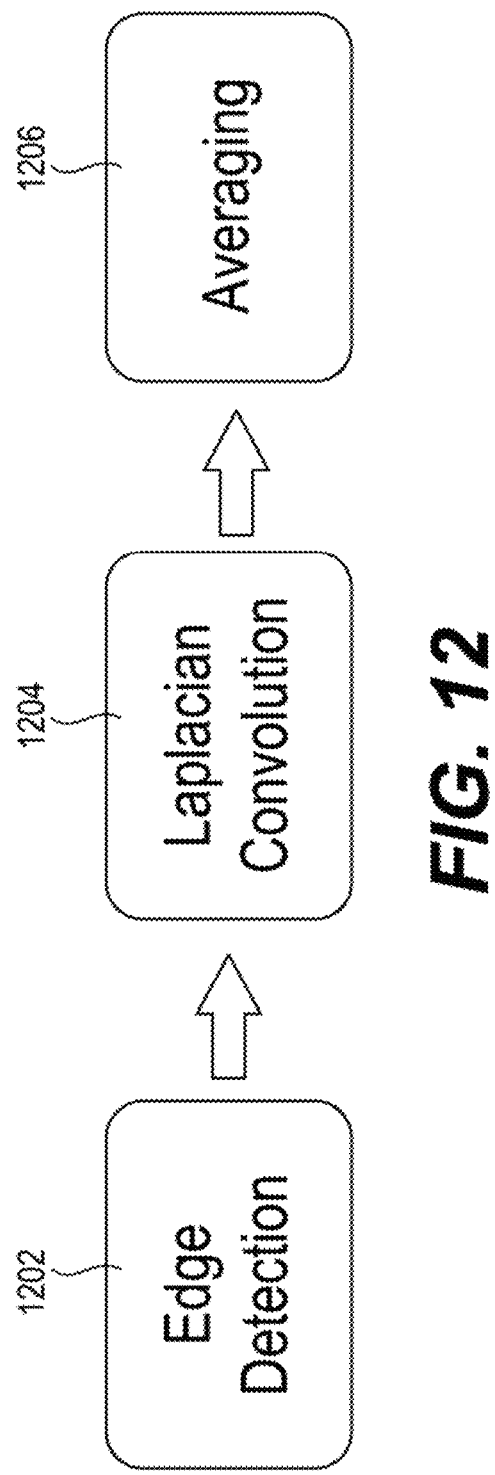
FIG. 12 shows a schematic illustration of an exemplary noise detection process.

In an example, a noise detection process can be shown in FIG. 12. As shown in FIG. 12, at (1202), a Sobel operation can be used for edge detection to exclude edges from noise detection.

According to the Sobel operation, a current picture can be denoted as I(x,y), where (x,y) is a coordinate of a pixel. An output of the Sobel operator can be described in equation (25) as follows:

$$G = \left| I(x, y) * \begin{bmatrix} -1 & -2 & -1 \\ 0 & 0 & 0 \\ 1 & 2 & 1 \end{bmatrix} \right| + \left| I(x, y) * \begin{bmatrix} -1 & 0 & 1 \\ -2 & 0 & 2 \\ -1 & 0 & 1 \end{bmatrix} \right| \qquad \text{Eq. (25)}$$

where |•| defines an absolute operator. An edge map can be determined using a threshold $G_{th}$ for G. At (1202), pixels with $G<G_{th}$ can be used in the noise detection with a Laplacian operator. At (1204), a noise level calculation can be described in equation (26).

$$\sigma = \sqrt{\frac{\pi}{2}} \frac{1}{6(W-2)(H-2)} \sum_{x,y} |I(x, y) * N| \qquad \text{Eq. (26)}$$

where N can be a Laplacian operator according to equation (27).

$$N = \begin{bmatrix} 1 & -2 & 1 \\ -2 & 4 & -2 \\ 1 & -2 & 1 \end{bmatrix} \qquad \text{Eq. (27)}$$

Sample content, such as a blank screen, can be easily detected for a block with B×B pixels by comparing a pixel variance and/or a pixel value range (e.g., max_pixel_val− min_pixel_val).

To reduce computational complexity, down-sampled pictures can be used for pre-analysis of a video sequence in video encoders. In an example, a pre-analysis picture can be down sampled with a 1:2 ratio both vertically and horizontally from an original full-sized picture, which can result in a down-sampled pre-analysis picture with ¼ of the number of pixels as in the original picture.

In some cases, the down-sampled pictures can be stored along with the original picture, for example until the original picture is no longer needed in the encoding process.

Figure 13:
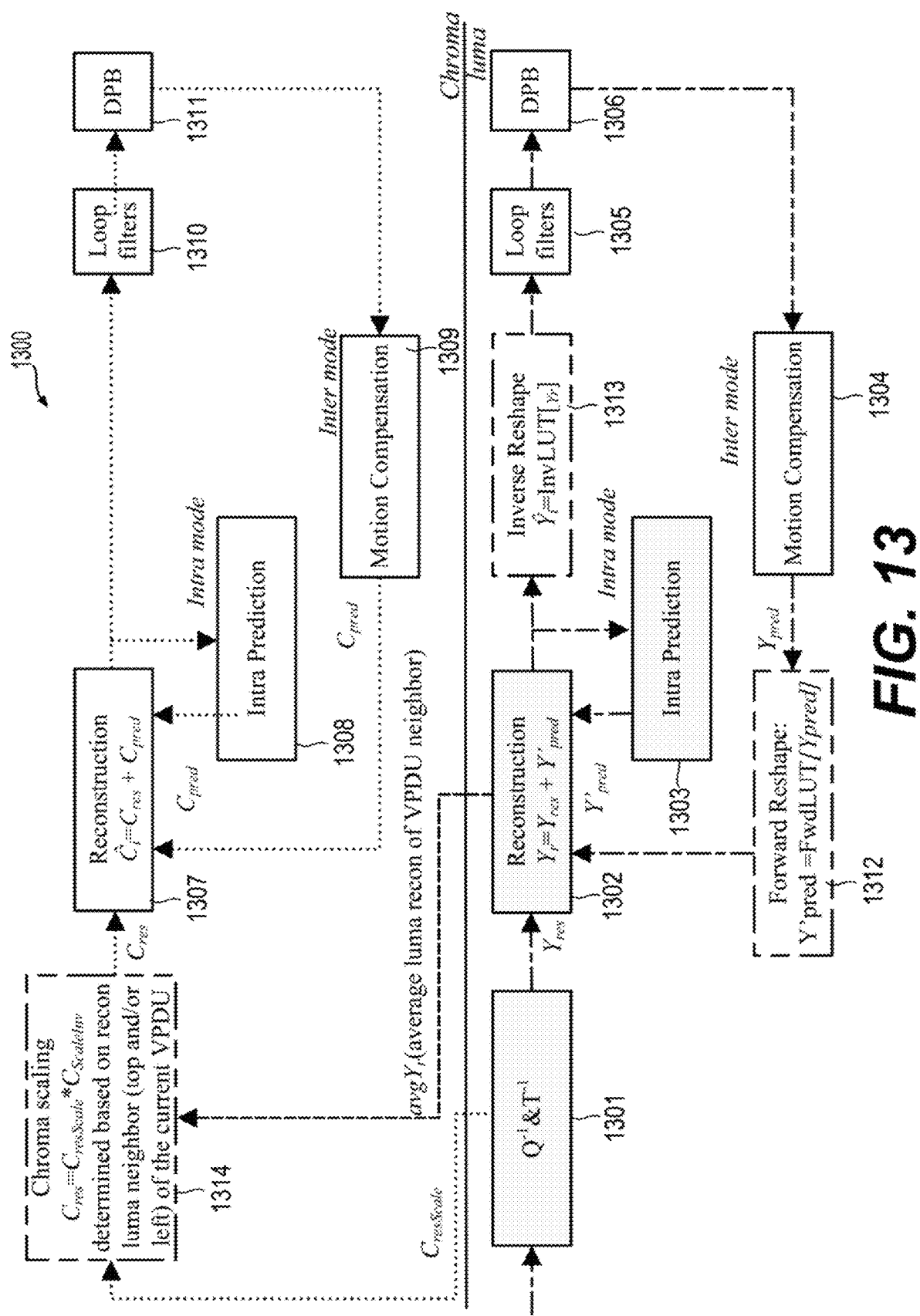
FIG. 13 shows a schematic illustration of an exemplary luma mapping with chroma scaling architecture.

A coding tool called luma mapping with chroma scaling (LMCS) can be added as a new processing block before the loop filters, such as in VVC. LMCS can have two main components: (1) in-loop mapping of a luma component based on adaptive piecewise linear models, and (2) for chroma components, luma-dependent chroma residual scaling can be applied. FIG. 13 shows a LMCS architecture (1300) from a perspective of a decoder. As shown in FIG. 13, blocks (1301)-(1303) can indicate a mapped domain in which the LMCS is applied. The block (1301) can include an inverse quantization and an inverse transform, the block (1303) can include a luma intra prediction, and the block (1302) can include a reconstruction process to add a luma prediction with a luma residual. Blocks (1304)-(1311) can be an original (or non-mapped) domain in which the LMCS is applied. The original domain can include loop filters (e.g., (1305) and (1310)) that can include deblocking, ALF, and SAO, motion compensated prediction (e.g., (1304) and (1309)), chroma intra prediction (e.g., 1308)), adding of the chroma prediction together with the chroma residual (e.g., (1307)), and storage of decoded pictures as reference pictures (e.g., (1311) and (1306)). Blocks (1312)-(1314) can include LMCS functional blocks. Block (1312) can include forward mapping of a luma signal, block (1313) can include inverse mapping of the luma signal, and block (1314) can include a luma-dependent chroma scaling process. Like other tools in VVC, LMCS can be enabled/disabled at a sequence level using an SPS flag.

In a luma mapping with a piecewise linear model, in-loop mapping of a luma component can adjust a dynamic range of an input signal by redistributing codewords across the dynamic range to improve compression efficiency. Luma mapping can make use of a forward mapping function, FwdMap, and a corresponding inverse mapping function, InvMap. The FwdMap function can be signaled using a piecewise linear model with 16 equal pieces. The InvMap function may not need to be signaled, and may be derived from the FwdMap function.

The luma mapping model can be signaled in an adaptation parameter set (APS) syntax structure with an APS parameter type (e.g., aps_params_type) being set equal to 1 (or 1 LMCS_APS). Up to 4 LMCS APS can be used in a coded video sequence. Only 1 LMCS APS can be used for a picture. The luma mapping model can be signaled using a piecewise linear model. The piecewise linear model can partition the dynamic range of the input signal into 16 equal pieces. For each piece, linear mapping parameters of the respective piece can be expressed using the number of codewords assigned to the respective piece. Using 10-bit input as an example, each of the 16 pieces can have 64 codewords assigned to the respective piece by default. The signaled number of the codewords can be used to calculate a scaling factor and adjust the mapping function accordingly for the corresponding piece. At the slice level, an LMCS enable flag can be signaled to indicate if the LMCS process shown in FIG. 13 can be applied to a current slice. If LMCS is enabled for the current slice, an APS identity (e.g., aps_id) can be signaled in a slice header to identify an APS that carries the luma mapping parameters of the LMCS process.

Each i-th piece, i=0 . . . 15, of the FwdMap piecewise linear model can be defined by two input pivot points InputPivot[ ] and two output (mapped) pivot points MappedPivot[ ]. The InputPivot[ ] and MappedPivot[ ] can be computed as follows (assuming 10-bit video):

1)  OrgCW = 64
2)  For i = 0:16, InputPivot[ i ] = i * OrgCW
3)  For i=0:16, MappedPivot[i] is calculated as follows:
    MappedPivot[ 0 ] = 0;
    for( i = 0; i <16 ; i++)
        MappedPivot[ i + 1 ] = MappedPivot[ i ] + SignalledCW[ i ]

where SignalledCW[ i ] can be the signaled number of codewords for the i-th piece.

As shown in FIG. 13, for an inter-coded block, motion compensated prediction can be performed in the mapped domain. In other words, after the motion-compensated prediction block $Y_{pred}$ is calculated based on the reference signals in the DPB (e.g., (1306)), the FwdMap function (1312) can be applied to map the luma prediction block in the original domain to the mapped domain, $Y'_{pred}$=FwdMap($Y_{pred}$). For an intra-coded block, the FwdMap function may not be applied because intra prediction can be performed in the mapped domain. After a reconstructed block Y, is calculated, such as in block (1302), the InvMap function (1313) can be applied to convert the reconstructed luma values in the mapped domain back to the reconstructed luma values in the original domain ($\hat{Y}_i$=InvMap($Y_r$)). The InvMap function can be applied to both intra- and inter-coded luma blocks.

The luma mapping process (forward and/or inverse mapping) can be implemented using either look-up tables (LUT) or using on-the-fly computation. If a LUT is used, FwdMapLUT and InvMapLUT can be pre-calculated and pre-stored for use at the tile group level, and forward and inverse mapping can be simply implemented as FwdMap($Y_{pred}$)=FwdMapLUT[$Y_{pred}$] and InvMap($Y_r$)=InvMapLUT[$Y_r$], respectively. Alternatively, on-the-fly computation may be used. Using forward mapping function FwdMap as an example, in order to figure out which piece includes a luma sample, a sample value of the luma sample can be right-shifted by 6 bits (which corresponds to 16 equal pieces). Then, the linear model parameters for the corresponding piece can be retrieved and applied on-the-fly to compute the mapped luma value. When i is a piece index, a1, a2 are InputPivot[i] and InputPivot[i+1], respectively, and b1, b2 are MappedPivot[i] and MappedPivot[i+1], respectively, the FwdMap function can be evaluated as follows in equation (28):

$$\text{FwdMap}(Y_{pred})=((b2-b1)/(a2-a1))*(Y_{pred}-a1)+b1 \qquad \text{Eq. (28)}$$

The InvMap function can be computed on-the-fly in a similar manner. Generally, pieces in the mapped domain may not be equal sized. Therefore, a most straightforward inverse mapping process can require comparisons in order to figure out which piece of the pieces in the mapped domain can include the current sample value. Such comparisons can increase decoder complexity. Therefore, a bitstream constraint can be imposed on the values of the output pivot points MappedPivot[i] as follows: assume a range of the mapped domain (for 10-bit video, the range can be [0, 1023]) is divided into 32 equal pieces. If MappedPivot[i] is not a multiple of 32, then MappedPivot[i+1] and MappedPivot[i] may not belong to the same piece of the 32 equal-sized pieces, e.g., MappedPivot[i+1]>>(BitDepth$_Y$−5) may not be equal to MappedPivot[i]>>(BitDepth$_Y$−5). Based on the bitstream constraint, the InvMap function can also be carried out using a simple right bit-shift by 5 bits (which corresponds 32 equal-sized pieces) in order to figure out which piece include the current sample value.

In luma-dependent chroma residual scaling, chroma residual scaling can be designed to compensate for an interaction between a luma signal and corresponding chroma signals of the luma signal. Whether the chroma residual scaling is enabled or not can also be signaled at a slice level. If luma mapping is enabled, an additional flag can be signaled to indicate if luma-dependent chroma residual scaling is enabled or not. When luma mapping is not used, luma-dependent chroma residual scaling can be disabled. Further, luma-dependent chroma residual scaling may be disabled for chroma blocks that include an area less than or equal to 4.

Chroma residual scaling can depend on an average value of top and/or left reconstructed neighboring luma samples of a current virtual pipeline data unit (VPDU). If a current CU is one of inter 128×128, inter 128×64, or inter 64×128, then a chroma residual scaling factor derived for the CU associated with a first VPDU can be used for all chroma transform blocks in the CU. Denote avgYr as an average of the reconstructed neighboring luma samples that are shown in block (1314) in FIG. 13. The value of $C_{ScaleInv}$ can be computed in steps as follows:

1) Find the index $Y_{Idx}$ of the piecewise linear model to which avgYr belongs based on the InvMap function.
2) $C_{ScaleInv}=C_{ScaleInv}[Y_{Idx}]$, where $C_{ScaleInv}[\ ]$ is a 16-piece LUT pre-computed based on the value of SignalledCW[i] and a offset value signaled in APS for chroma residual scaling process.

Unlike luma mapping, which is performed on the sample basis, $C_{ScaleInv}$ can be a constant value for the entire chroma block. Based on $C_{ScaleInv}$, chroma residual scaling can be applied as follows in equations (29) and (30):

$$\text{Encoder side: } C_{ResScale}=C_{Res}*C_{Scale}=C_{Res}/C_{ScaleInv} \qquad \text{Eq. (29)}$$

$$\text{Decoder side: } C_{Res}=C_{ResScale}/C_{Scale}=C_{ResScale}*C_{ScaleInv} \qquad \text{Eq. (30)}$$

Results of scene transition detection can be used to optimize encoding performance, such as assisting rate control and/or coding tool adjustment. Scene transition detection can also be used to improve encoding speed. An abrupt change in the content, for example from a camera flash picture or an inserted picture, may reduce the performance of an inter picture prediction and/or temporal filtering. Other coding tools may also get affected by the abrupt content change.

Figure 14:
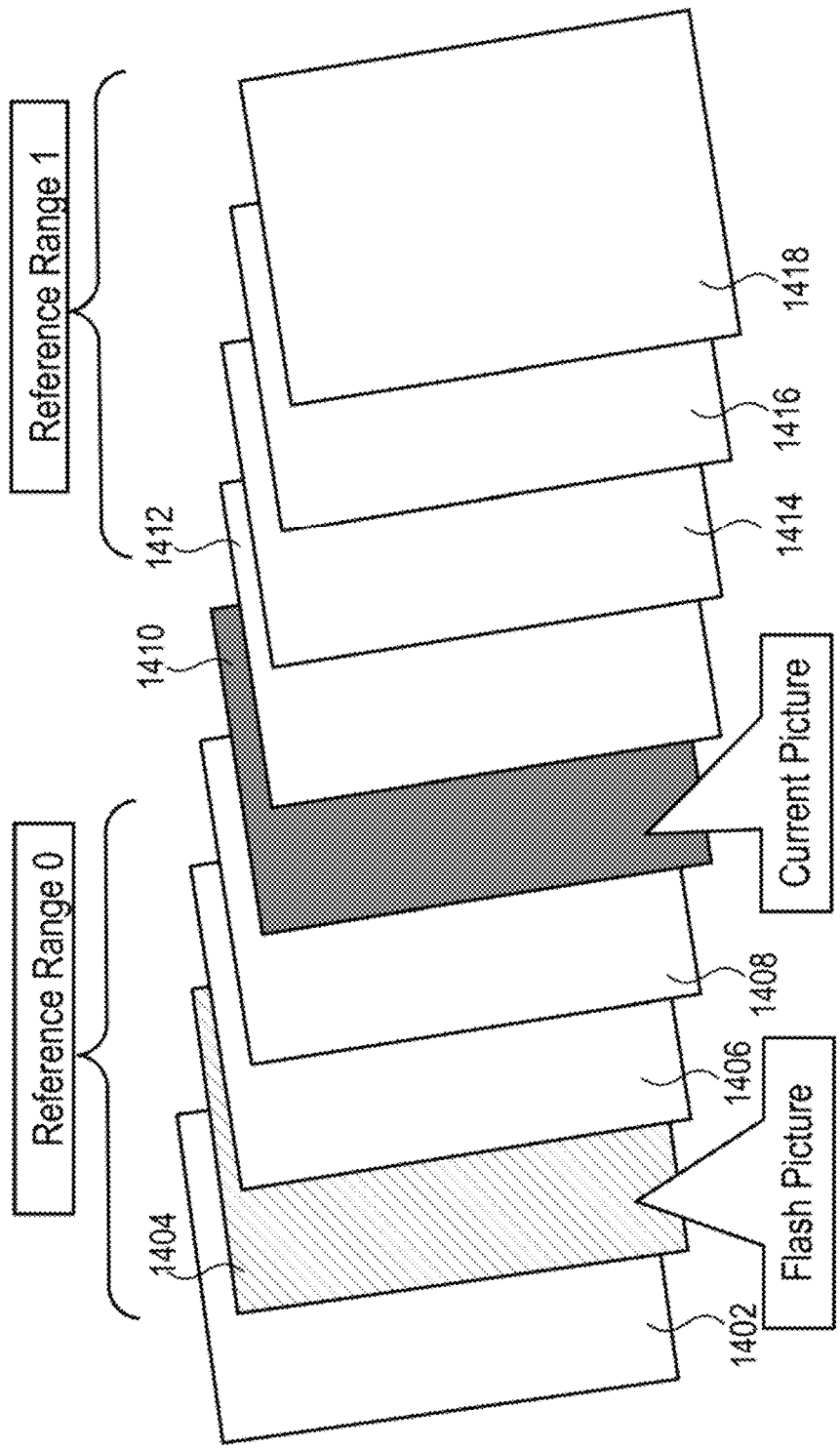
FIG. 14 shows a schematic illustration of an exemplary flash picture in temporal filtering references.

In the disclosure, flash detection based encoding methods can be provided to detect flash pictures in a sequence of pictures, where a scene change can be detected between the flash pictures and neighboring pictures of the flash pictures. For example, the flash pictures and the neighboring pictures can have different contents (e.g., contrasts, features, or objects). In some embodiments, both camera flash pictures, inserted pictures, or other pictures with an abrupt change in content, can be referred to as flash pictures. In some embodiments, a flash picture (e.g., a camera flash picture) and neighboring pictures of the flash picture can belong to a same scene, but the flash picture and the neighboring pictures can have different contrasts which may be considered a scene change for the purpose of detecting a flash picture in some embodiments. In some embodiments, a flash picture (e.g., an inserted picture) can be a picture that belongs to a first scene, and a previous neighboring picture and a past neighboring picture of the picture can belong to a second scene. The first scene can be different from the second scene. For example, the first scene and the second scene can include different features or different objects. In some embodiments, whether a picture is a flash picture can be determined based on a scene change between (i) a first scene of the picture in a sequence of pictures and (ii) a second scene of a prior picture and a subsequent picture of the picture in the sequence of pictures. The scene change can be detected based on a content change between the first scene and the second scene being larger than a threshold. For example, as shown in FIG. 14, a picture (1404) can be determined as a flash picture because the picture (1404) belongs to a first scene that is different from a second scene of a prior picture (1402) and a subsequent picture (1406) of the picture (1404). As described above, the scene change can be detected based on one or more content changes, which can include at least one of a feature or contrast change for example.

In some embodiments, an encoding processing, such as at least one of a temporal filter process or an encoding process, can be performed on a current picture in a sequence of pictures based on (i) whether the picture is determined as a flash picture and (ii) whether the picture is the current picture.

In the disclosure, flash pictures can be excluded from or in one or more certain encoding processes. For example, flash pictures may be excluded in the temporal filtering process.

In an embodiment, based on a picture being determined as the flash picture and being a current picture, the picture can be excluded in the temporal filtering process.

In another embodiment, if a picture is detected as flash picture, the picture may not be used as a reference picture. For example, the picture may not be used in the temporal filtering process for a current picture.

In an example, the detected flash picture(s) in a reference range for a temporal filter of the temporal filtering process can be excluded and only remaining reference pictures in the reference range can be used. For example, only the remaining reference pictures in the reference range may be used for the temporal filtering process. In the example shown in FIG. 14, based on the picture (1404) being detected as the flash picture, the picture (1404) can be excluded for the temporal filter, and only remaining reference pictures (1402), (1406), and (1408) in the reference range 0 can be used for the temporal filtering process.

In an example, a reference range (or temporal filter reference range) can include N pictures on a temporal side of a current picture. When the reference range includes a flash picture or multiple flash pictures on the temporal side, the temporal filter reference range can be extended to include one or more non-flash reference pictures to maintain a number of pictures as N on the temporal side, unless no additional reference pictures are available due to other restrictions. For example, as shown in FIG. 14, the picture (1404) can be included in a reference range 0 and positioned on a left temporal side with respect to a current picture (1410) (or a temporal side prior to the current picture (1410)). When the picture (1404) is detected as a flash picture, the reference range 0 can extend toward a temporal direction prior to the picture (1402) to include one more non-flash picture. Thus, a total number of the non-flash reference pictures in the reference range 0 remains constant, such as 4 shown in FIG. 14.

In the disclosure, special handling of inter predictions and coding tools on flash pictures can be provided, such as in an encoder side. For example, an encoder can determine or label a flash picture and then perform one or more encoding processes based on the determined flash picture.

In an embodiment, when a picture is detected as a flash picture, the picture may be set as non-reference picture for a current picture in a prediction, such as an inter prediction.

In an embodiment, when a picture is detected as a flash picture, the picture can be moved to a higher temporal level (or temporal layer) in a group of pictures (GOP). The temporal level can indicate a hierarchy level in which a picture in a lower level can be applied to predict a picture in a higher level.

In an embodiment, when a picture is detected as a flash picture, a slice type in the picture can be changed. For example, the slice type of the picture can be set as a P slice.

In an embodiment, when a picture is detected as a flash picture, a cost estimation of a picture level weighted prediction (e.g., weighted prediction (WP)) can be added in the encoding process for the picture. In the cost estimation, a difference between a current picture and a prediction of the current picture can be calculated. The prediction can be obtained based on a weighted combination of the flash picture and another reference picture of the current picture.

In an embodiment, when a reference picture of a current picture is detected as a flash picture, and the current picture is a B picture with two reference picture lists, some bi-prediction tools, such as BDOF and/or DMVR, may be disabled at a picture level. In an example, disabling of the bi-prediction tools can be signaled in a picture header.

In an embodiment, when a picture is detected as a flash picture and a LMCS tool is enabled, the LMCS tool may be disabled for the picture at a picture level or a slice level. Accordingly, a rate-distortion optimization search based on the LMCS can be skipped for the picture on the encoder.

In an embodiment, when a picture is detected as a flash picture and the LMCS tool is enabled and applicable to the picture, LMCS picture analysis can be performed for the picture to determine a new set of LMCS parameters that are different from LMCS parameters for non-flash pictures. For example, the new set of LMCS parameters can be a set of new linear mapping parameters. The new set of LMCS parameters can be further applied to the flash picture for the LMCS process.

In an embodiment, when a picture is detected as a flash picture and the LMCS tool is enabled and applicable to the picture, a pre-defined set of LMCS parameters for a flash scene can be checked on the encoder side when an on/off decision is made for LMCS. The LMCS parameters for the flash scene may be associated with the picture in some embodiments, for example different LMCS parameters may be associated with different types of flash scenes. In an example, the pre-defined set of LMCS parameter can be generated by training general flash pictures. The general flash pictures can be sample flash pictures associated with content changes, contrast changes, or scene changes. In an example, the pre-defined LMCS parameters can be signaled in a particular APS. The particular APS can be reserved for the pre-defined LMCS parameters.

Figure 15:
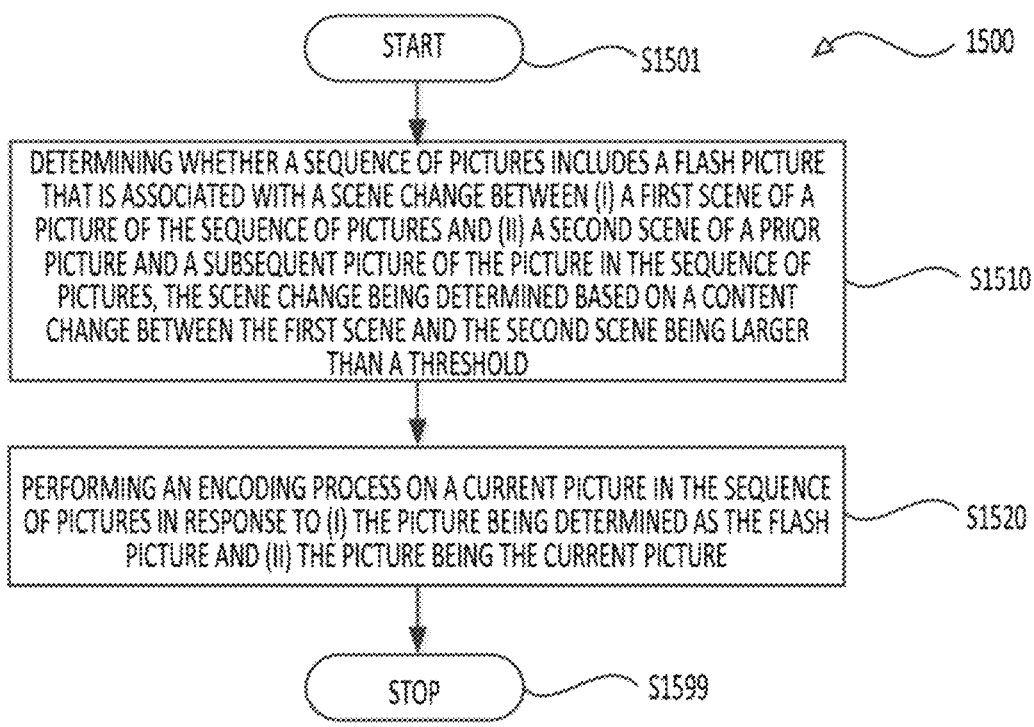
FIG. 15 shows a flow chart outlining an exemplary encoding process according to some embodiments of the disclosure.

FIG. 15 shows a flow chart outlining an exemplary encoding process (1500) according to some embodiments of the disclosure. The process (or embodiment) may be implemented by processing circuitry (e.g., one or more processors or one or more integrated circuits). In one example, the one or more processors execute a program that is stored in a non-transitory computer-readable medium.

The process (e.g., (1500)) can be used in the encoding of a block, so as to generate a prediction block for the block. In various embodiments, the process (e.g., (1500)) is executed by processing circuitry, such as the processing circuitry in the terminal devices (310), (320), (330) and (340), the processing circuitry that performs functions of the video encoder (403), the processing circuitry that performs functions of the video encoder (603), and the like. In some embodiments, the process (e.g., (1500)) is implemented in software instructions, thus when the processing circuitry executes the software instructions, the processing circuitry performs the process (e.g., (1500)).

As shown in FIG. 15, the process (1500) can start from (S1501) and proceed to (S1510). At (S1510), whether a sequence of pictures includes a flash picture can be determined. The flash picture can be associated with a scene change between (i) a first scene of a picture of the sequence of pictures and (ii) a second scene of a prior picture and a subsequent picture of the picture in the sequence of pictures. The scene change can be determined based on a content change between the first scene and the second scene being larger than a threshold.

At (S1520), an encoding process can be performed on a current picture in the sequence of pictures in response to (i) the picture being determined as the flash picture and (ii) the picture being the current picture.

In an example, the picture can be determined as the flash picture based on a contrast difference between the first scene and the second scene being larger than the threshold. In an example, the picture can be determined as the flash picture based on a feature difference between the first scene and the second scene being larger than the threshold.

When the encoding process includes the temporal filter process, the temporal filter process may not be performed on the picture based on the picture being determined as the flash picture and being the current picture.

When the encoding process includes a temporal filter process, the picture can be excluded as a reference picture in the temporal filter process based on the picture being determined as the flash picture and not being the current picture.

In response to the picture being excluded as the reference picture in the temporal filter process, another picture can be added to the sequence of pictures as a reference picture for the temporal filter process. Thus, a total number of reference pictures for the temporal filter process can remain constant. The other picture and the picture can be positioned at a same temporal side of the current picture in the temporal filter process.

The encoding process can include one of an attribute adjustment, a cost estimation, or a luma mapping with chroma scaling (LMCS) process. The LMCS process can include in-loop mapping of a luma component of the current picture and a scaling of a luma-dependent chroma residual of the current picture.

When the encoding process includes the attribute adjustment, the picture can be moved to a higher temporal level in the sequence of pictures based on the picture being the flash picture.

When the encoding process includes the attribute adjustment, a slice type of the picture can be set as a P slice based on the picture being the flash picture.

When the encoding process includes the attribute adjustment, the picture can be determined as a non-reference picture of the current picture based on the picture being the flash picture and not being the current picture.

When the encoding process includes the cost estimation, the cost estimation can be performed to generate a difference between the current picture and a prediction that is based on a weighted combination of the picture and another reference picture of the current picture based on the picture being determined as the flash picture and not being the current picture.

In some embodiments, at least one of bi-direction optical flow (BDOF) or decoder side motion vector refinement (DMVR) can be disabled for the current picture in the encoding process in response to (i) the picture being determined as the flash picture and being a reference picture of the current picture, and (ii) the current picture being a B type picture with two reference picture lists.

When the encoding process includes the LMCS process, the LMCS process can be disabled for the picture based on the picture being determined as the flash picture.

When the encoding process includes the LMCS process, based on the picture being determined as the flash picture, a set of LMCS parameters can be determined for the picture based on an LMCS picture analysis. The LMCS can be performed on the picture based on the determined set of LMCS parameters.

When the encoding process includes the LMCS process, the LMCS can be performed on the picture based on a predefined set of LMCS parameters in response to the picture being determined as the flash picture. The predefined set of LMCS parameters can be generated by training a plurality of general flash pictures.

After (S1520), the process proceeds to (S1599) and terminates.

The process (1500) can be suitably adapted. Step(s) in the process (1500) can be modified and/or omitted. Additional step(s) can be added. Any suitable order of implementation can be used.

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
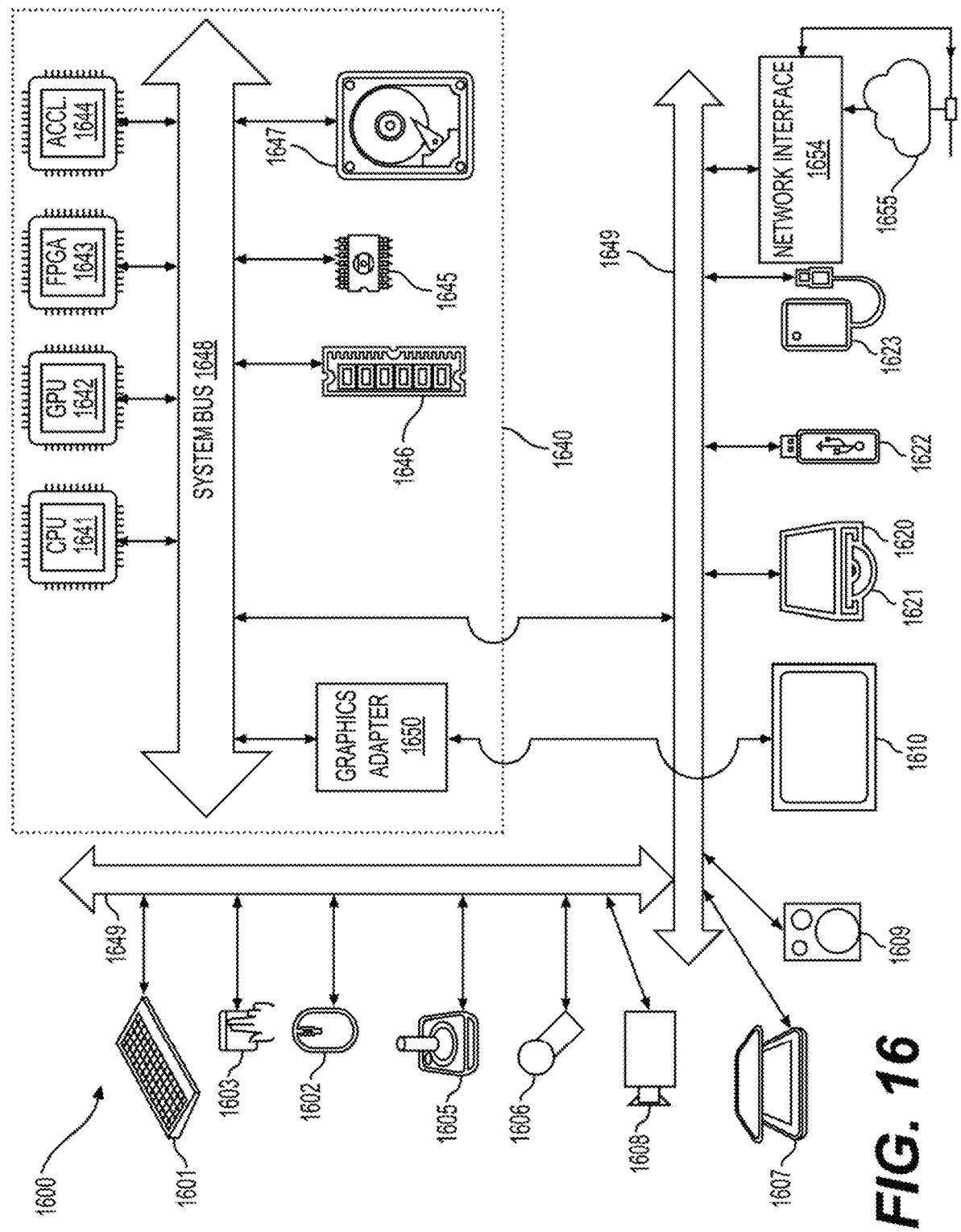
FIG. 16 is a schematic illustration of a computer system in accordance with an embodiment.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface (1654) to one or more communication networks (1655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), graphics adapters (1650), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). In an example, the screen (1610) can be connected to the graphics adapter (1650). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video encoding performed in a video encoder, the method comprising:
   determining whether a picture of a sequence of pictures is a flash picture that is associated with a scene change between (i) a first scene of the picture of the sequence of pictures and (ii) a second scene of a prior picture and a subsequent picture of the picture in the sequence of pictures, the scene change being determined based on a content change between the first scene and the second scene being larger than a threshold; and
   performing an encoding process on the picture in the sequence of pictures such that a temporal filter process is not applied to the picture in response to (i) the picture being determined as the flash picture and (ii) the picture being a current picture.

2. The method of claim 1, wherein the determining comprises one of:
   determining that the picture is the flash picture based on a contrast difference between the first scene and the second scene being larger than the threshold; and
   determining that the picture is the flash picture based on a feature difference between the first scene and the second scene being larger than the threshold.

3. The method of claim 1, wherein:
   the encoding process includes the temporal filter process, and
   the picture is excluded as a reference picture in the temporal filter process based on the picture being determined as the flash picture and not being the current picture.

4. The method of claim 3, wherein the performing the encoding process further comprises:
   in response to the picture being excluded as the reference picture in the temporal filter process,
   adding another picture to the sequence of pictures as a reference picture for the temporal filter process such that a total number of reference pictures for the temporal filter process remains constant, the other picture and the picture being positioned at a same temporal side of the current picture in the temporal filter process.

5. The method of claim 1, wherein the encoding process includes one of an attribute adjustment, a cost estimation, or a luma mapping with chroma scaling (LMCS) process, the LMCS process including in-loop mapping of a luma component of the current picture and a scaling of a luma-dependent chroma residual of the current picture.

6. The method of claim 5, wherein:
the encoding process includes the attribute adjustment, and
the performing the encoding process includes moving the picture to a higher temporal level in the sequence of pictures based on the picture being the flash picture.

7. The method of claim 5, wherein:
the encoding process includes the attribute adjustment, and
the performing the encoding process includes setting a slice type of the picture as a P slice based on the picture being the flash picture.

8. The method of claim 5, wherein:
the encoding process includes the attribute adjustment, and
the performing the encoding process includes determining the picture as a non-reference picture of the current picture based on the picture being the flash picture and not being the current picture.

9. The method of claim 5, wherein:
the encoding process includes the cost estimation, and
the performing the encoding process includes performing the cost estimation to generate a difference between the current picture and a prediction that is based on a weighted combination of the picture and another reference picture of the current picture based on the picture being determined as the flash picture and not being the current picture.

10. The method of claim 1, wherein the performing the encoding process includes:
disabling at least one of bi-direction optical flow (BDOF) or decoder side motion vector refinement (DMVR) for the current picture in the encoding process in response to (i) the picture being determined as the flash picture and being a reference picture of the current picture, and (ii) the current picture being a B type picture with two reference picture lists.

11. The method of claim 5, wherein:
the encoding process includes the LMCS process, and
the performing the encoding process includes disabling the LMCS process for the picture based on the picture being determined as the flash picture.

12. The method of claim 5, wherein:
the encoding process includes the LMCS process, and
the performing the encoding process further includes:
based on the picture being determined as the flash picture,
determining a set of LMCS parameters for the picture based on an LMCS picture analysis; and
performing the LMCS process on the picture based on the determined set of LMCS parameters.

13. The method of claim 5, wherein:
the encoding process includes the LMCS process, and
the performing the encoding process includes performing the LMCS process on the picture based on a predefined set of LMCS parameters in response to the picture being determined as the flash picture, the predefined set of LMCS parameters being generated by training a plurality of general flash pictures.

14. An apparatus, comprising:
processing circuitry configured to:
determine whether a picture of a sequence of pictures is a flash picture that is associated with a scene change between (i) a first scene of the picture of the sequence of pictures and (ii) a second scene of a prior picture and a subsequent picture of the picture in the sequence of pictures, the scene change being determined based on a content change between the first scene and the second scene being larger than a threshold; and
perform an encoding process on the picture in the sequence of pictures such that a temporal filter process is not applied to the picture in response to (i) the picture being determined as the flash picture and (ii) the picture being a current picture.

15. The apparatus of claim 14, wherein the processing circuitry is configured to perform one of:
determining that the picture is the flash picture based on a contrast difference between the first scene and the second scene being larger than the threshold; and
determining that the picture is the flash picture based on a feature difference between the first scene and the second scene being larger than the threshold.

16. The apparatus of claim 14, wherein:
the encoding process includes the temporal filter process, and
the picture is excluded as a reference picture in the temporal filter process based on the picture being determined as the flash picture and not being the current picture.

17. The apparatus of claim 16, wherein the processing circuitry is configured to:
in response to the picture being excluded as the reference picture in the temporal filter process,
add another picture to the sequence of pictures as a reference picture for the temporal filter process such that a total number of reference pictures for the temporal filter process remains constant, the other picture and the picture being positioned at a same temporal side of the current picture in the temporal filter process.

18. The apparatus of claim 14, wherein the encoding process includes one of an attribute adjustment, a cost estimation, or a luma mapping with chroma scaling (LMCS) process, the LMCS process including in-loop mapping of a luma component of the current picture and a scaling of a luma-dependent chroma residual of the current picture.

19. The apparatus of claim 18, wherein:
the encoding process includes the attribute adjustment, and
the processing circuitry is configured to perform the encoding process move the picture to a higher temporal level in the sequence of pictures based on the picture being the flash picture.

20. The apparatus of claim 18, wherein:
the encoding process includes the attribute adjustment, and
the processing circuitry is configured to perform the encoding process to set a slice type of the picture as a P slice based on the picture being the flash picture.

* * * * *